Sept. 8, 1936.  D. GILCHRIST  2,054,018
MACHINE TOOL
Filed Dec. 31, 1927    21 Sheets-Sheet 2
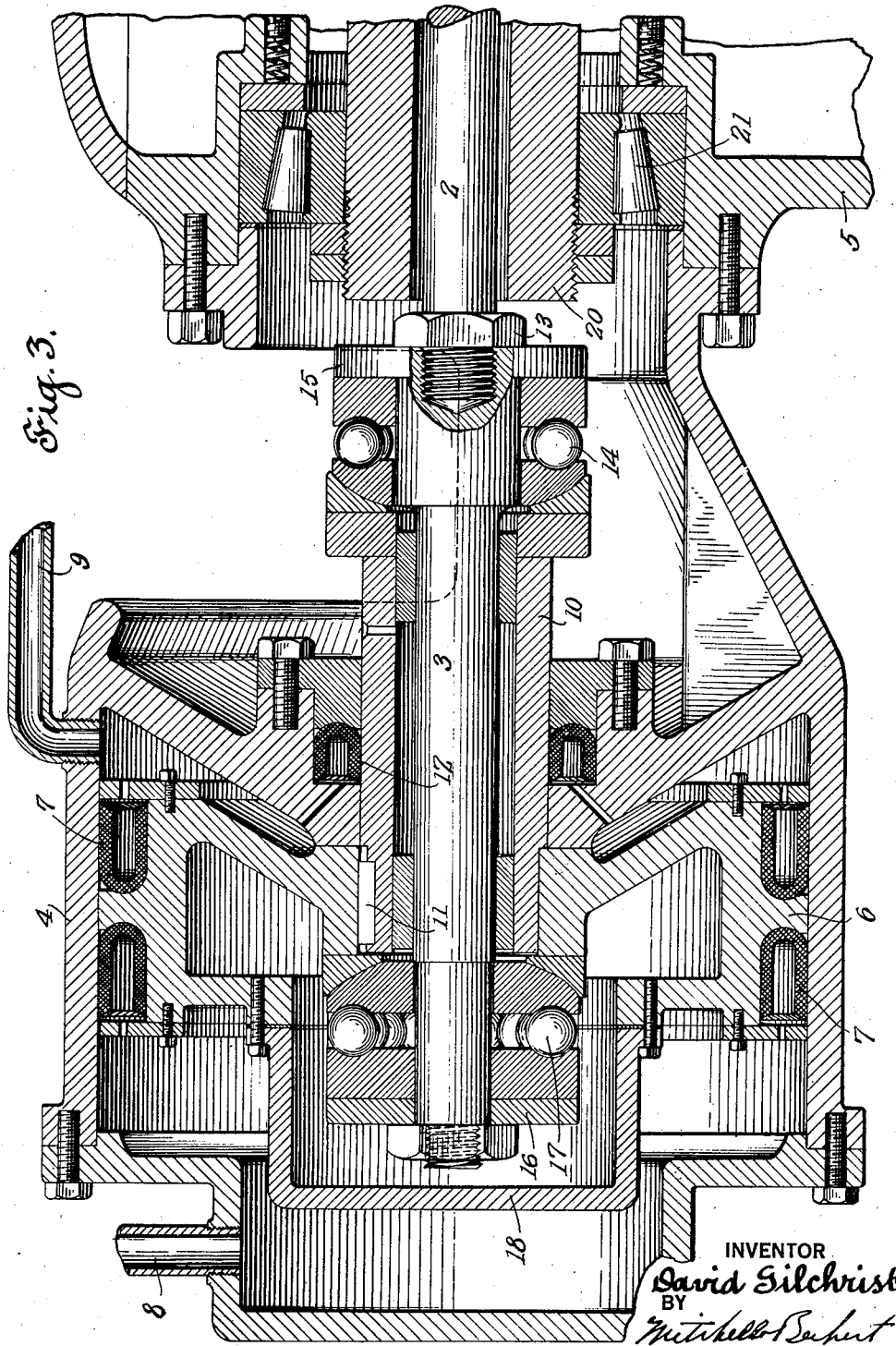

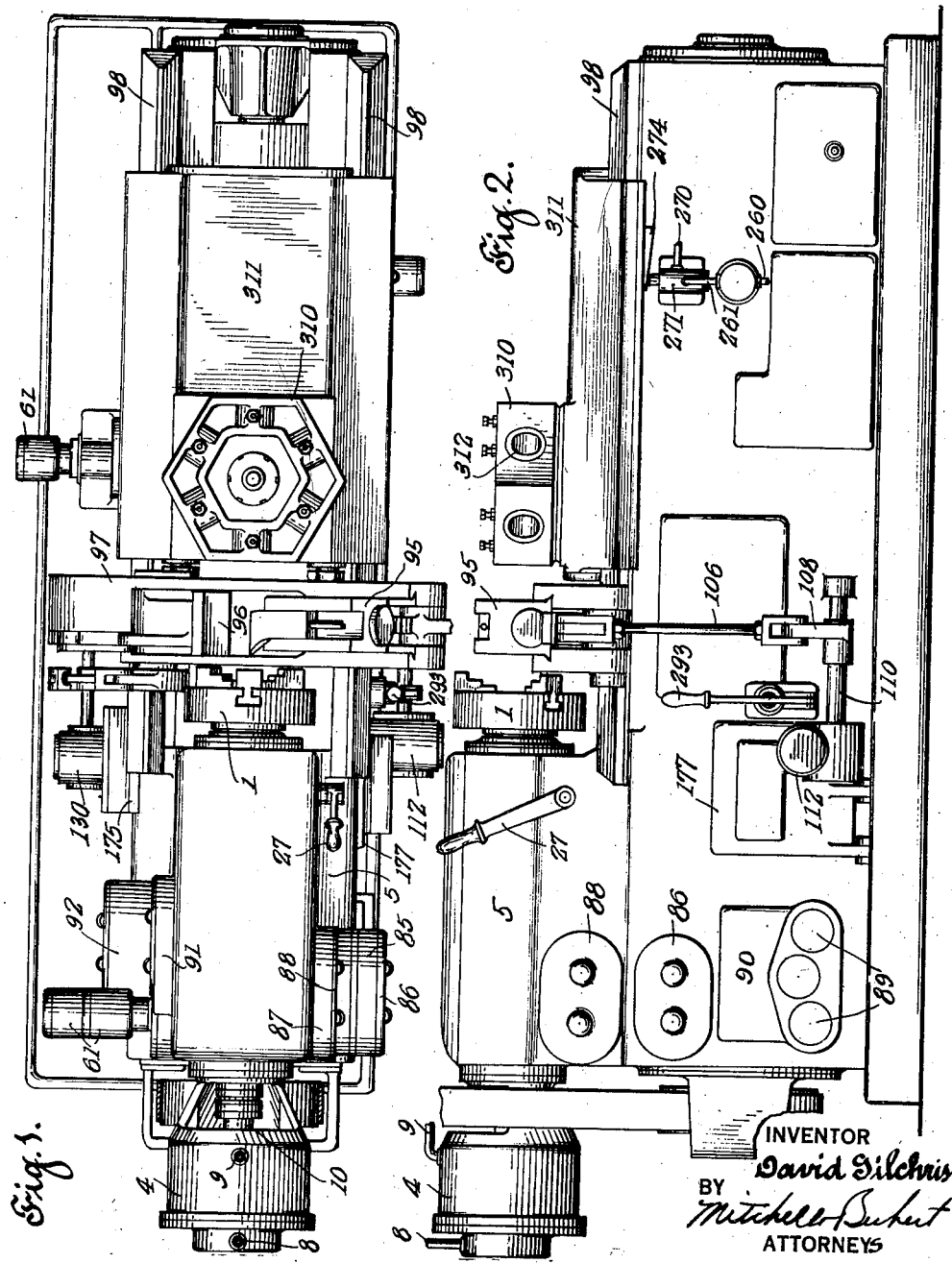

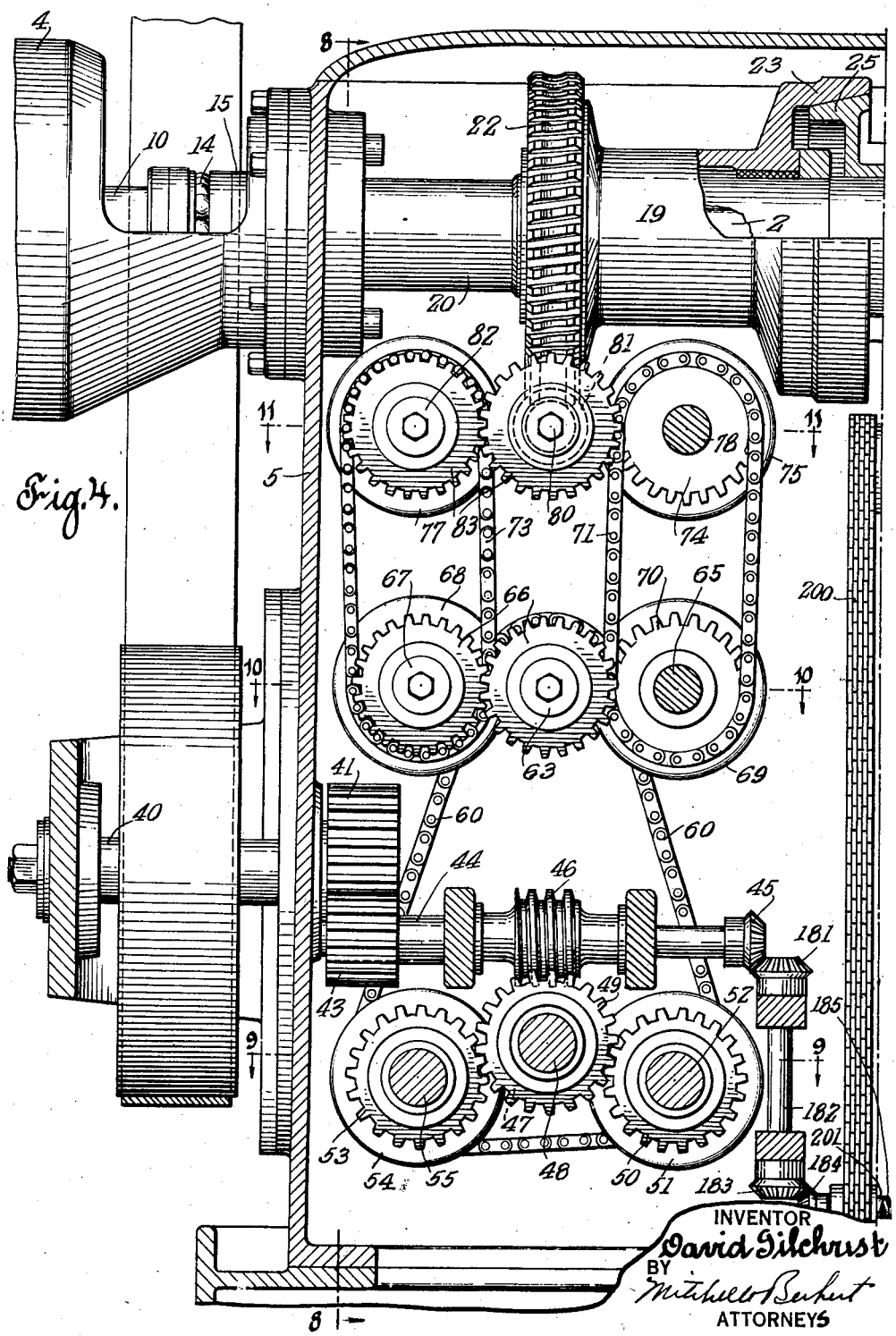

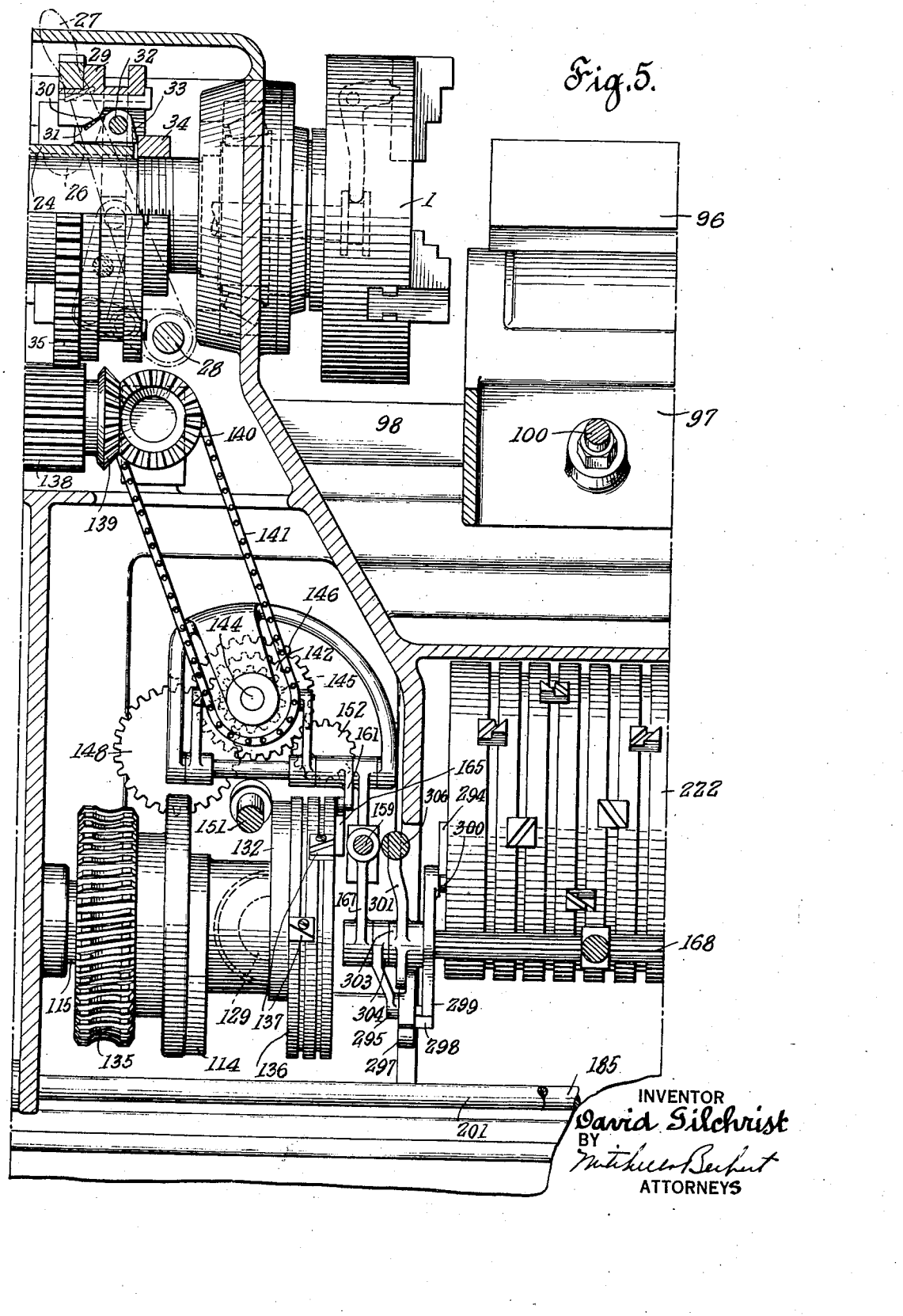

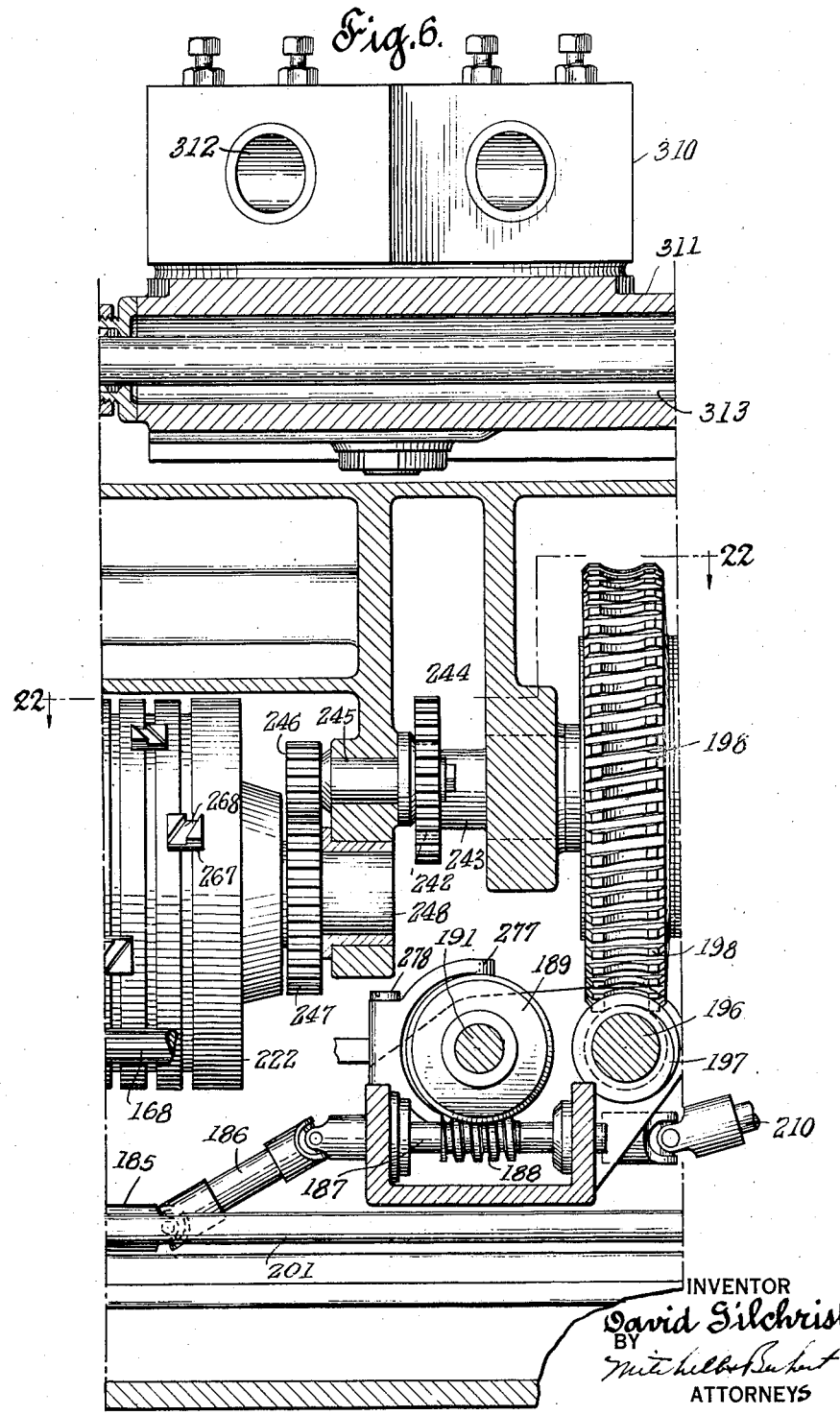

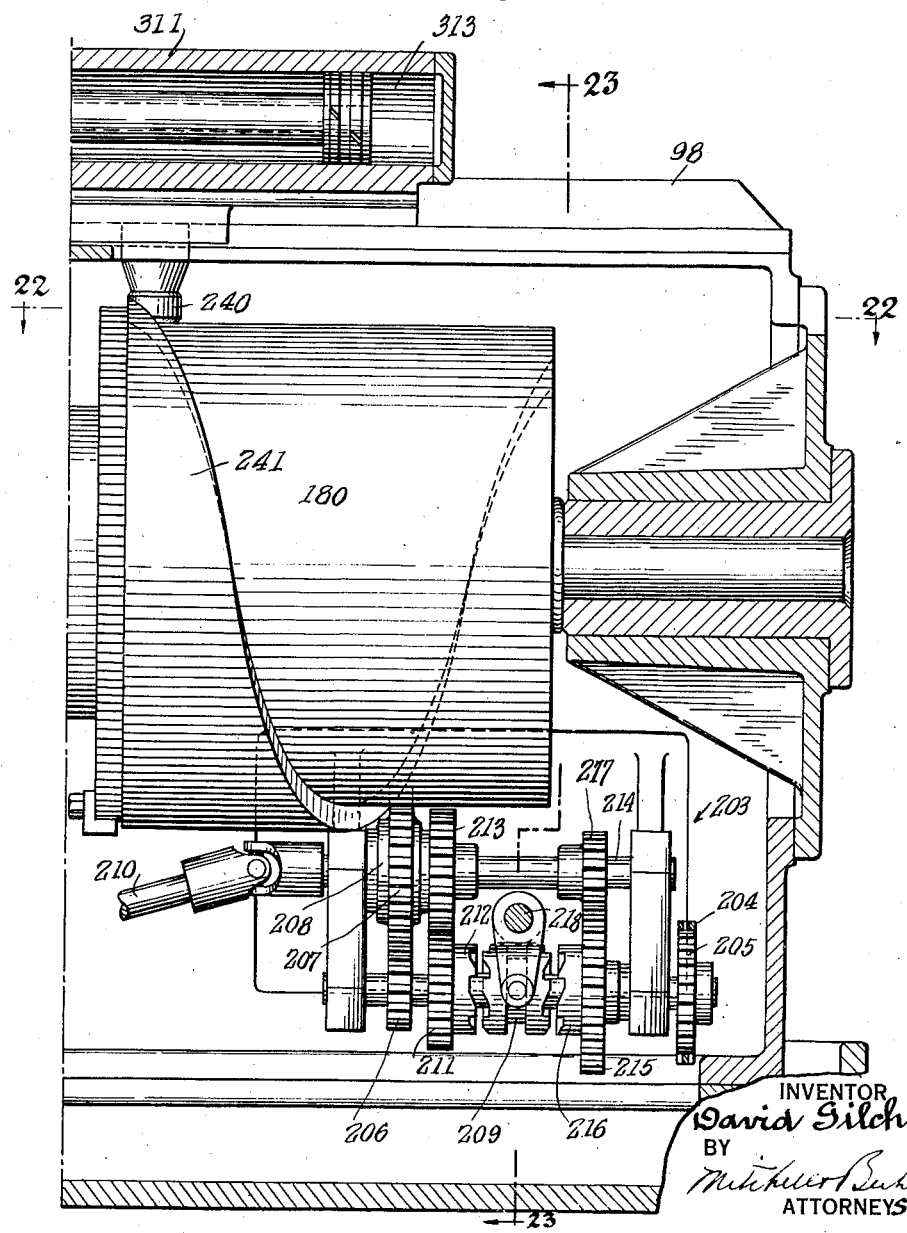

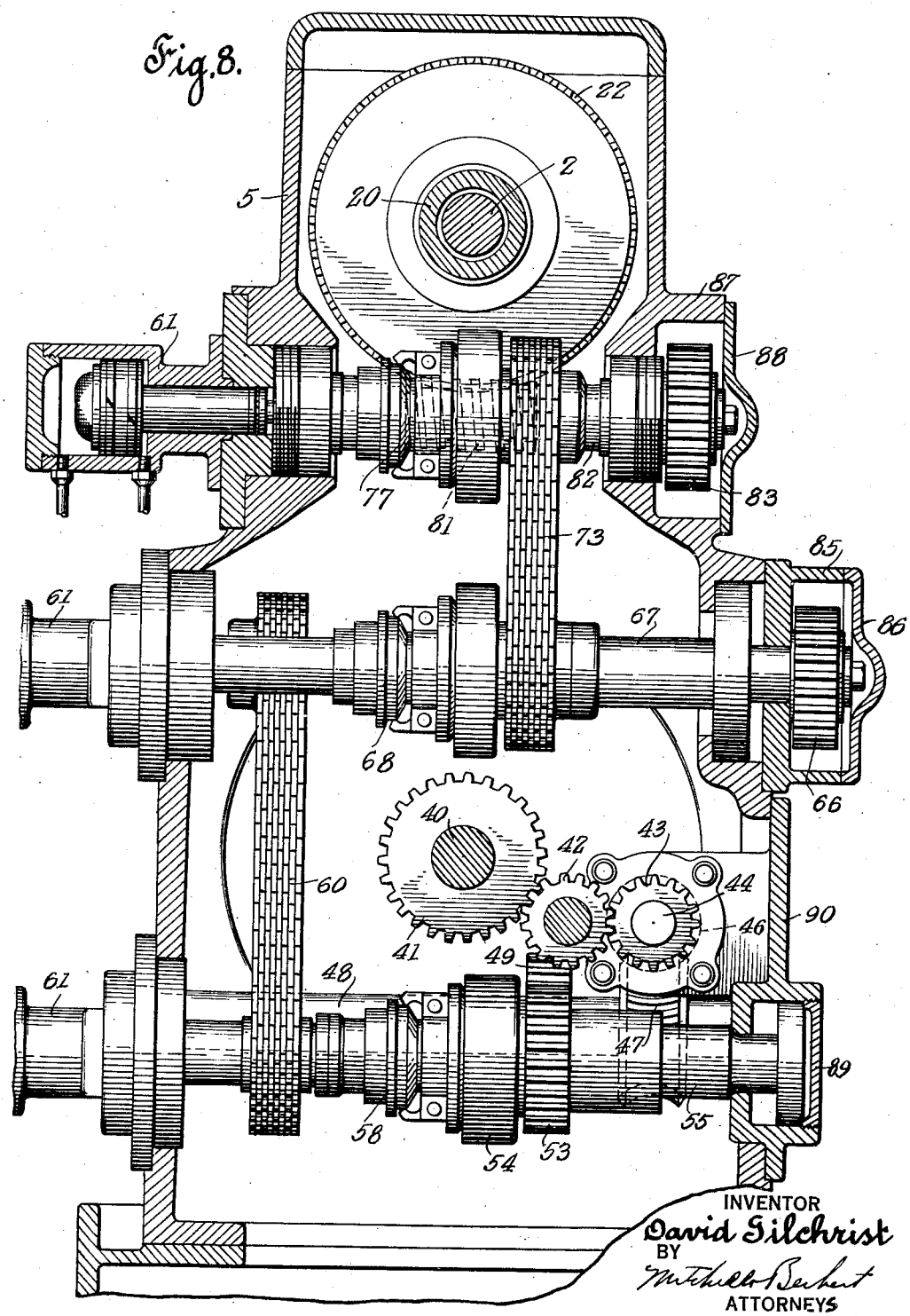

Sept. 8, 1936.  D. GILCHRIST  2,054,018
MACHINE TOOL
Filed Dec. 31, 1927   21 Sheets-Sheet 8
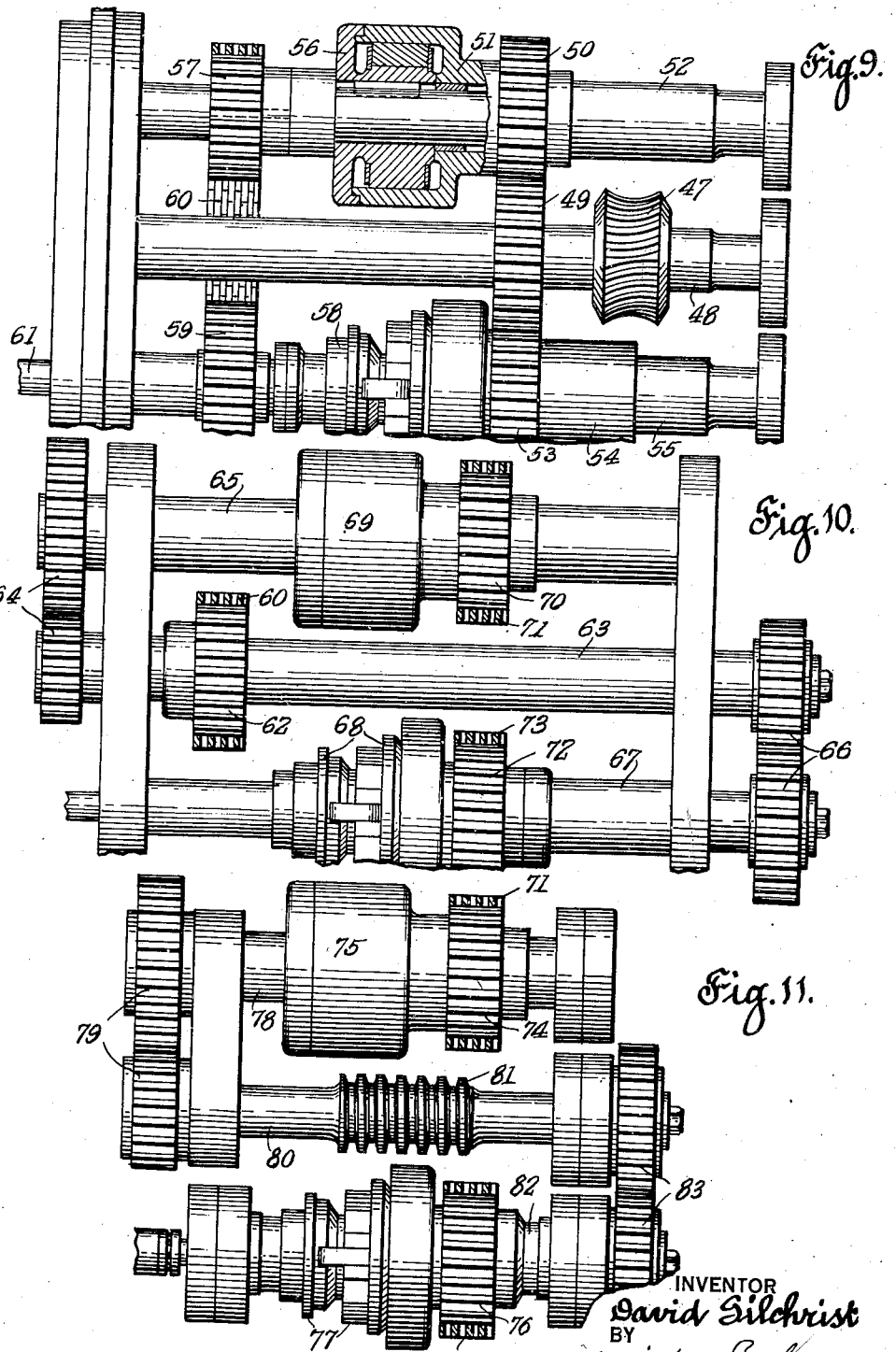

Sept. 8, 1936.  D. GILCHRIST  2,054,018
MACHINE TOOL
Filed Dec. 31, 1927  21 Sheets-Sheet 9
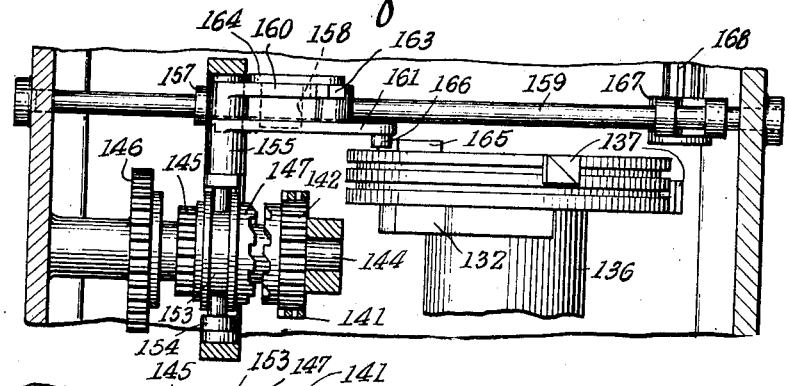

Sept. 8, 1936.   D. GILCHRIST   2,054,018
MACHINE TOOL
Filed Dec. 31, 1927    21 Sheets-Sheet 10

INVENTOR
David Gilchrist
BY
ATTORNEYS

Sept. 8, 1936.    D. GILCHRIST    2,054,018
MACHINE TOOL
Filed Dec. 31, 1927    21 Sheets-Sheet 11

INVENTOR
David Gilchrist
BY
Mitchell Bechet
ATTORNEYS

Sept. 8, 1936.　　　D. GILCHRIST　　　2,054,018
MACHINE TOOL
Filed Dec. 31, 1927　　　21 Sheets-Sheet 12

INVENTOR
David Gilchrist
BY
ATTORNEYS

Sept. 8, 1936. D. GILCHRIST 2,054,018
MACHINE TOOL
Filed Dec. 31, 1927 21 Sheets-Sheet 13

INVENTOR
David Gilchrist
BY
ATTORNEYS

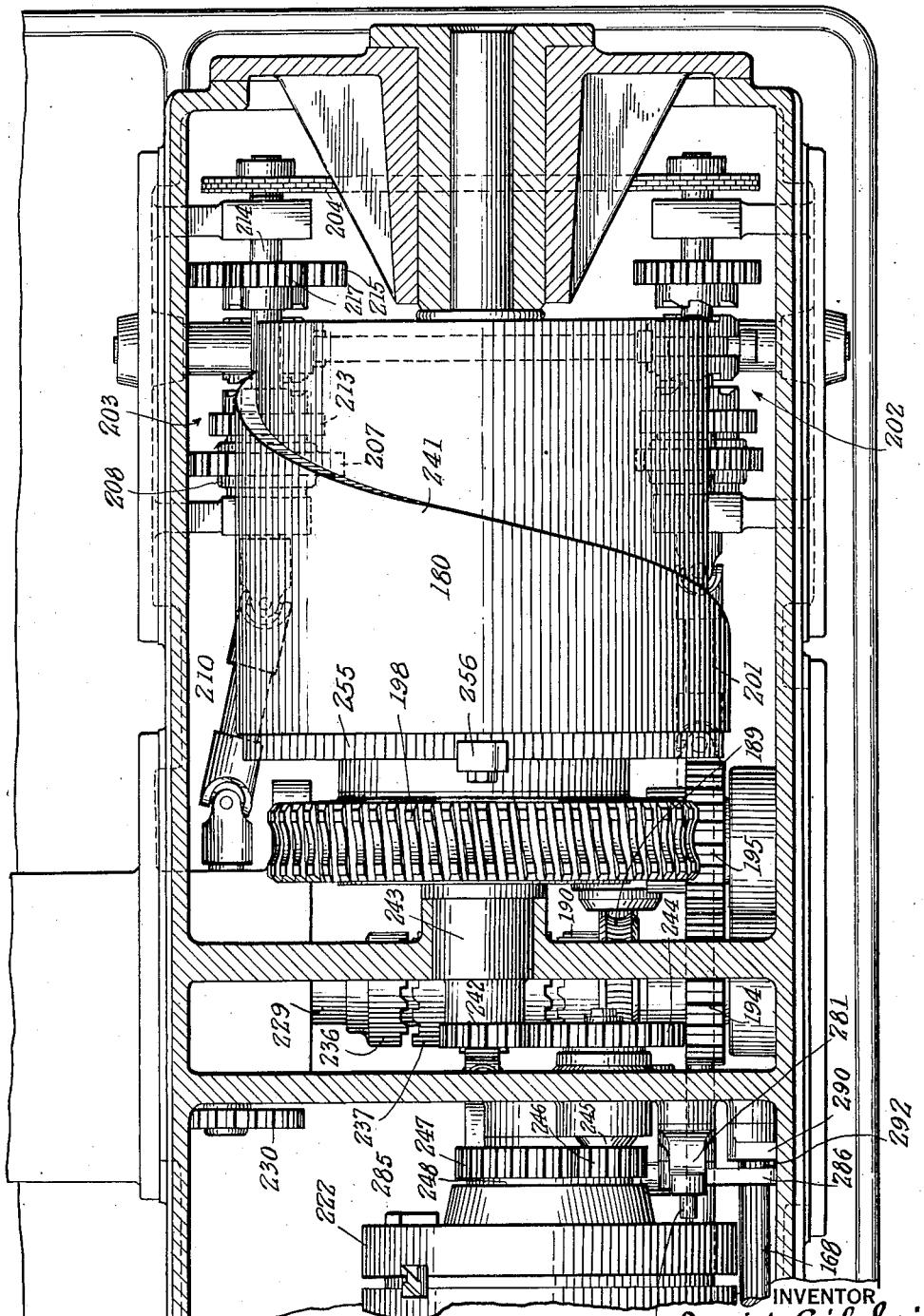

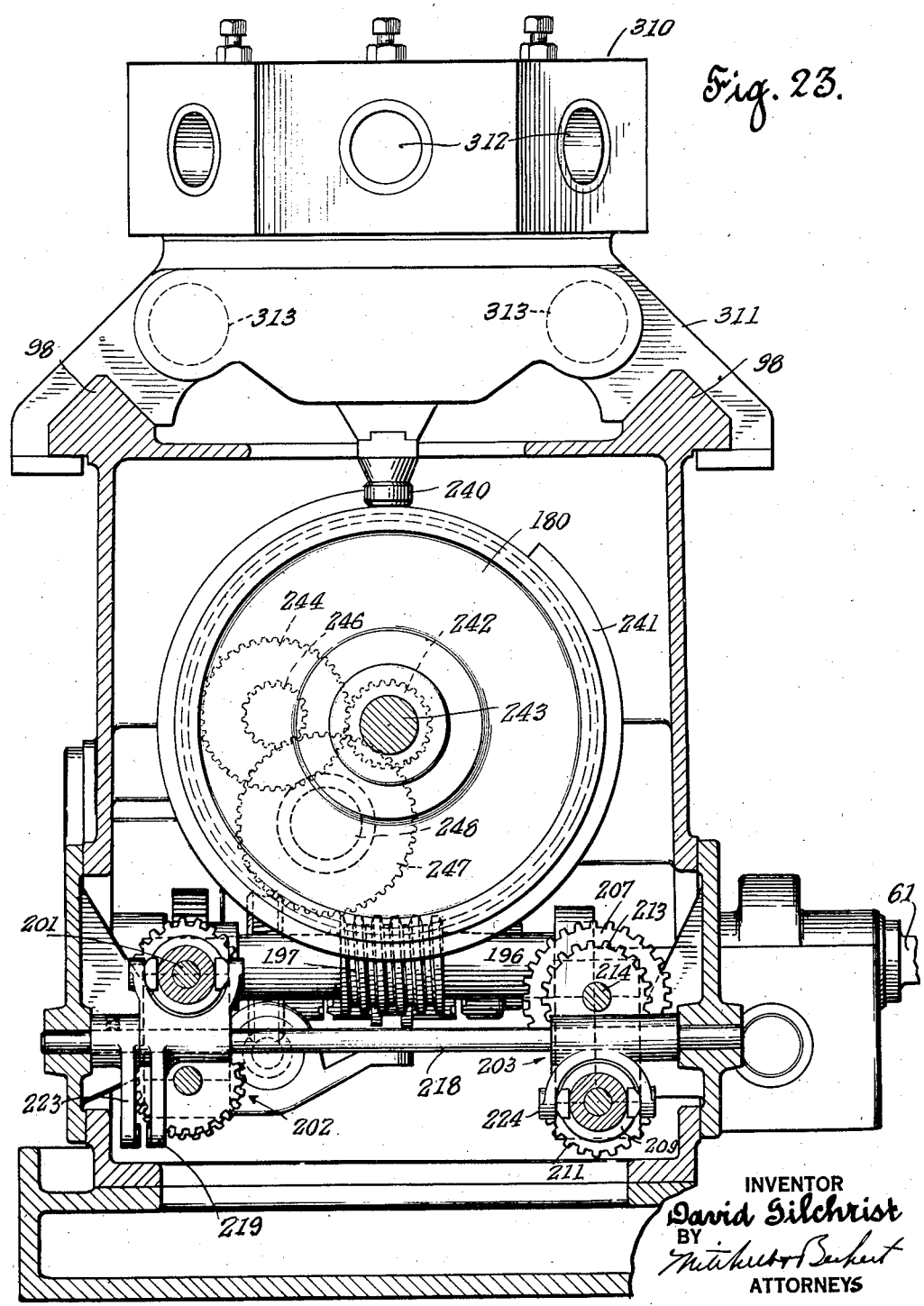

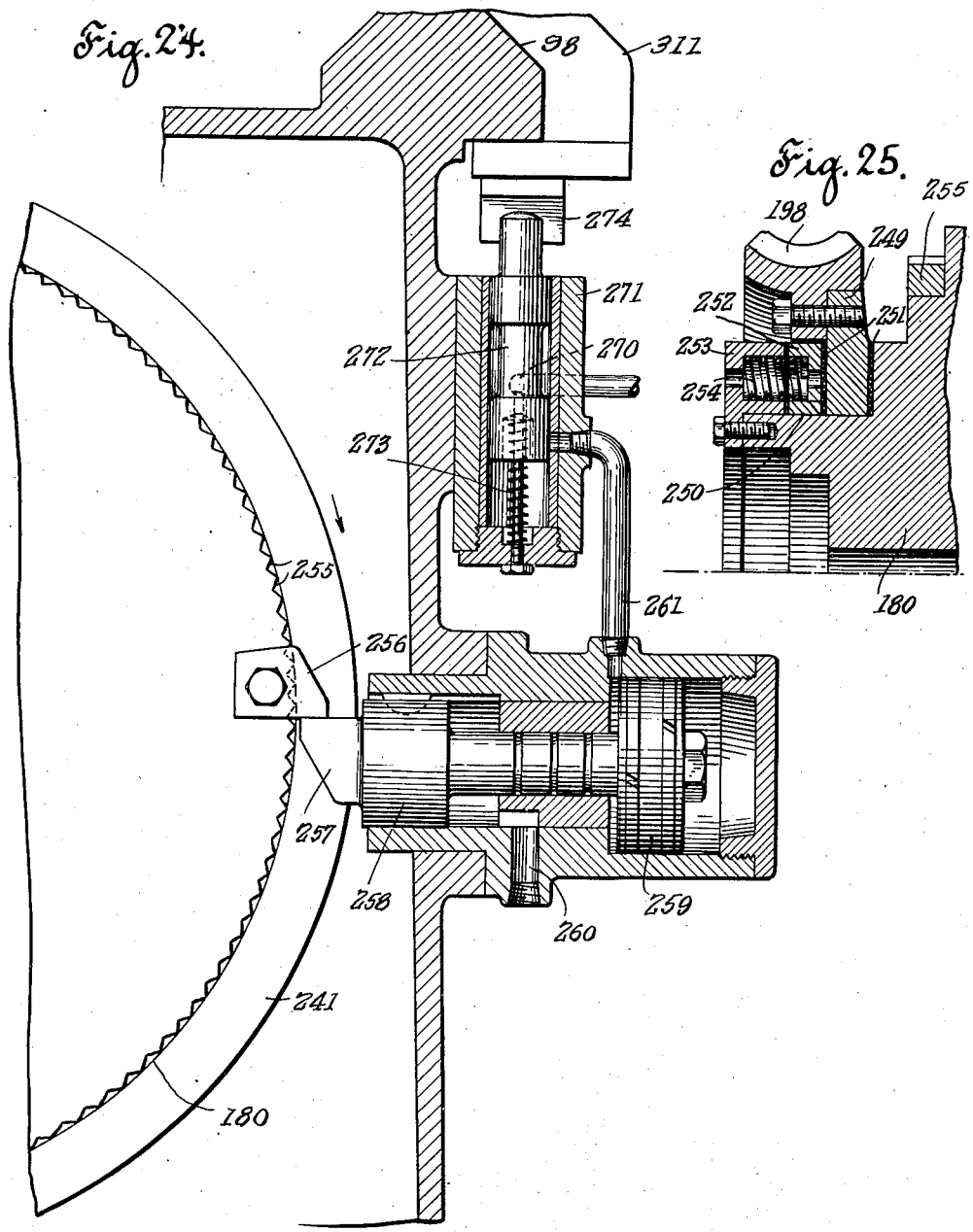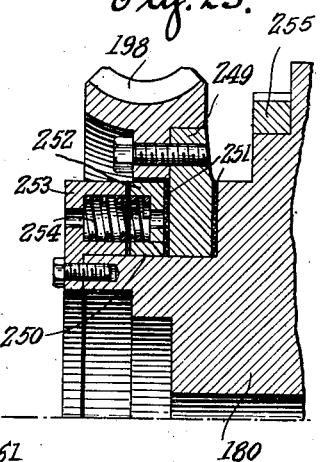

Sept. 8, 1936.   D. GILCHRIST   2,054,018
MACHINE TOOL
Filed Dec. 31, 1927   21 Sheets-Sheet 17

INVENTOR
David Gilchrist
BY
ATTORNEYS

Sept. 8, 1936.  D. GILCHRIST  2,054,018
MACHINE TOOL
Filed Dec. 31, 1927  21 Sheets-Sheet 18

INVENTOR
David Gilchrist
BY
ATTORNEYS

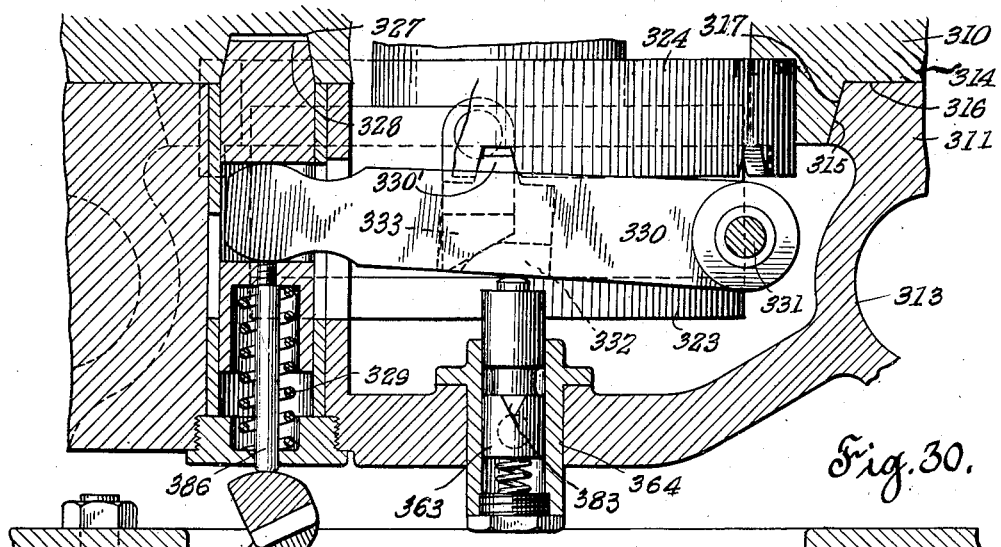
Fig. 30.
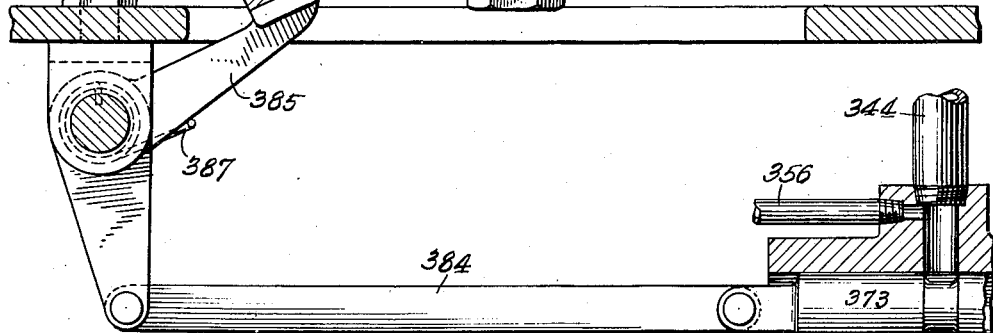
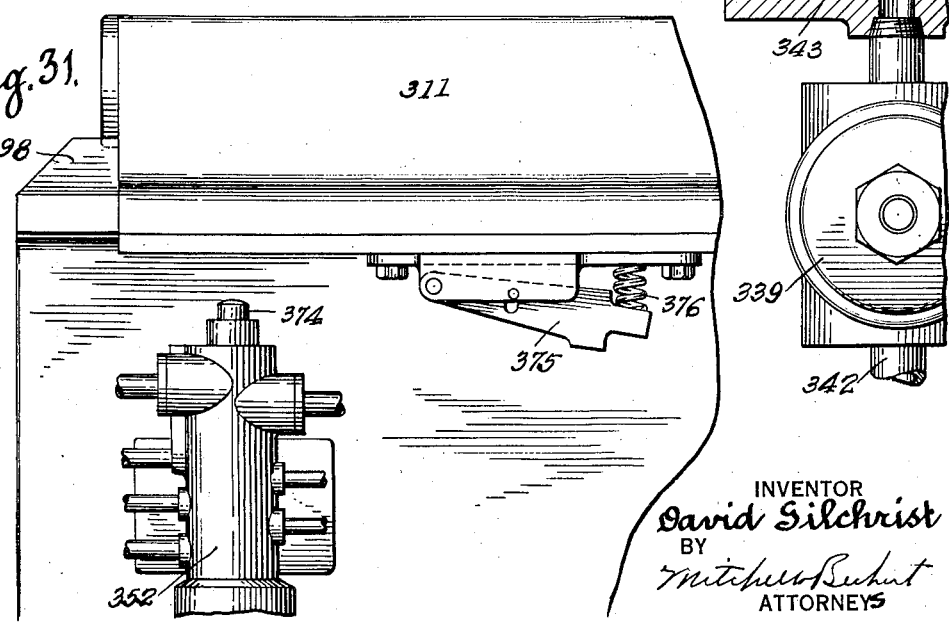
Fig. 31.

Sept. 8, 1936.  D. GILCHRIST  2,054,018

MACHINE TOOL

Filed Dec. 31, 1927  21 Sheets-Sheet 20

INVENTOR
David Gilchrist
BY
ATTORNEYS

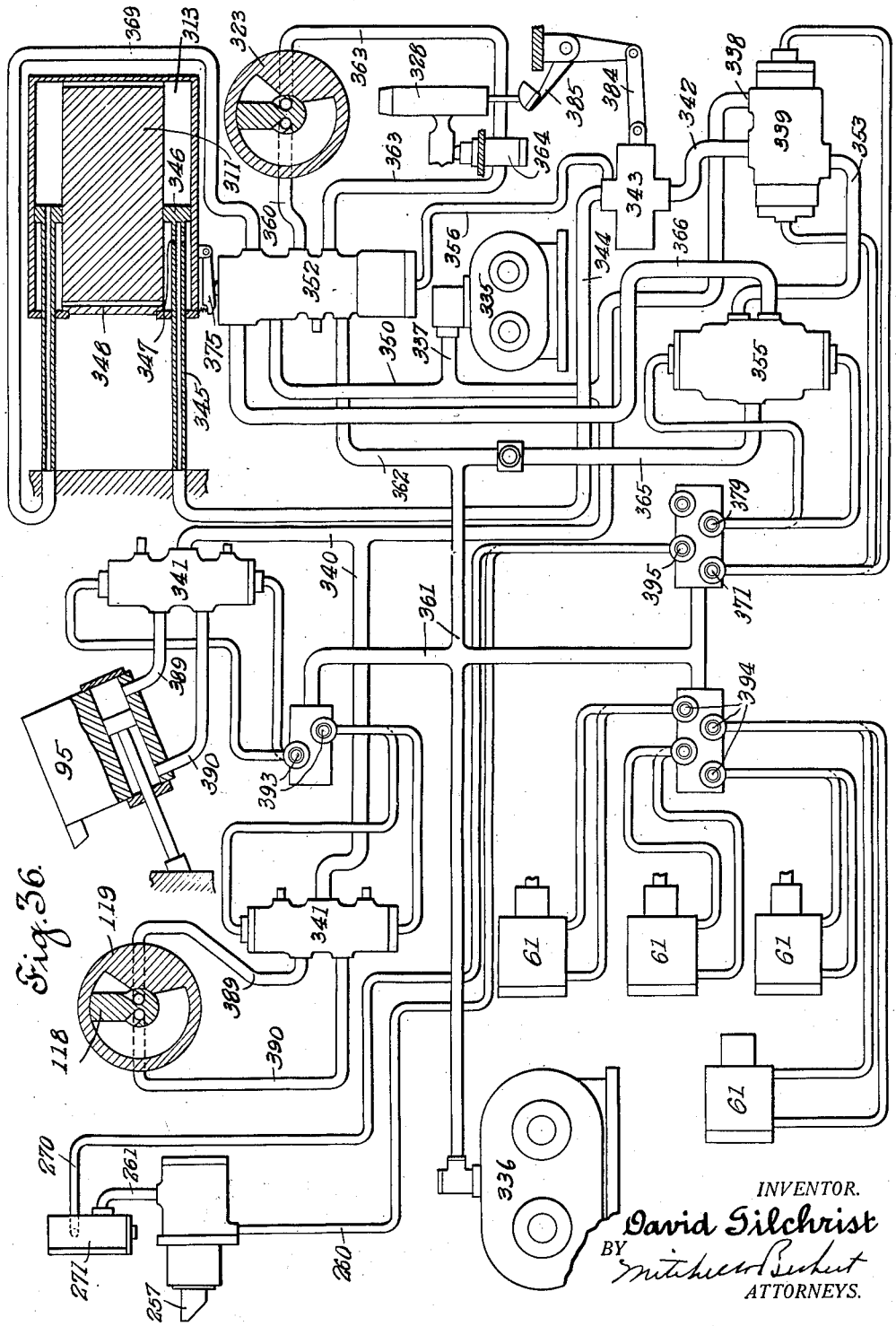

Patented Sept. 8, 1936

2,054,018

UNITED STATES PATENT OFFICE 2,054,018

MACHINE TOOL

David Gilchrist, Cleveland, Ohio, assignor, by mesne assignments, to The New Britain-Gridley Machine Company, New Britain, Conn., a corporation of Connecticut Application December 31, 1927, Serial No. 243,825

45 Claims. (Cl. 29—42)

My invention relates to machine tools, and more particularly to a hydraulically operated turret lathe.

It is a general object of the invention to provide a machine of the character indicated which will be accurate in its performance, and which will be exceedingly flexible in its operation.

It is a more specific object to provide a machine tool with hydraulic means for feeding the tool or tools and work relatively to each other, together with means for accurately controlling the feed.

It is another object to provide an improved turret which is indexed, locked and unlocked by fluid pressure means.

It is a further object to provide a machine tool with safety devices for automatically preventing certain operations from being performed until other desired operations have been completed.

It is still another object to provide a machine tool in which the feeds and speeds may be accurately controlled and varied between wide limits.

A further object is to provide a fluid actuated machine tool in which fluids under different pressures are employed.

It is a further object to provide improved means for synchronizing various functions during the operation of the machine.

Another object is to provide an improved form of chuck actuating mechanism.

Other objects will become apparent, and novel structural and functional features will be disclosed in the drawings and specification and pointed out in the claims.

The invention will be disclosed as embodied in a turret lathe having a multiple tool turret, which tools are fed in sequence to the rotating workpiece. It is to be observed that the particular embodiment illustrated is merely by way of example, and that various features of the invention are susceptible of embodiment in various other types of machines.

Briefly, the drawings chosen to illustrate the principles of the invention include a rotatable lathe chuck for holding the work-piece. By a system of change gears, as well as by various clutch devices, various speeds may be obtained. A turret having six stations is rotatably mounted upon a slide which is guided on suitable ways. The turret slide is advanced to and retracted from the work by hydraulic or other fluid actuated means, and, on the working stroke of the turret slide, the movement is resisted by feed cam means, which permits only the desired rate of feed of the tools relatively to the work. This rate of feed may be varied. The turret is locked in position on the slide and unlocked and indexed when unlocked by hydraulic means, the unlocking pressure preferably being greater than the locking pressure so that the possibility of failure to unlock will be reduced. Safety devices are employed for assuring a complete indexing of the turret before the slide can be fed forward relatively to the work.

By a system of gearing, the feed cam means, which resists the forward movement of the turret slide, may be moved at various speeds during a cycle of the machine for the purpose of bringing the tool to the work with a minimum of delay, and the particular tool operating at any instant fed at the optimum rate. The gearing system includes what may be termed a slow traverse, which slow traverse may be automatically or otherwise adjustable as to speed, and a fast traverse may, in addition, be employed for quickly returning the feed cam means at the time of or after the retraction of the turret slide.

One or more cross-slides may be employed, which cross-slides may be either of the true sliding type, or may be pivotally mounted so as to rock rather than slide. These cross-slides are also preferably urged toward the work by hydraulic means, and the force exerted by the hydraulic means is resisted by feed cams or other devices, to assure a proper feed of the cross-slide or slides. The cross-slides preferably are operated independently of the main turret, but provision is made for keeping all feeds in proper time relatively to each other.

A control drum or drums are employed for actuating certain hydraulic devices for controlling the speeds and feeds of the machine. Certain functions may be performed by mechanical devices, and not by hydraulic means.

The various functions of the machine are automatically timed and various devices synchronized during a cycle of the machine.

In the drawings, which, as intimated, show, for illustrative purposes only, a preferred form of the invention as embodied in a turret lathe—

Fig. 1 is a top plan view of a lathe illustrating features of the invention;

Fig. 2 is a front elevation of the lathe shown in Fig. 1;

Fig. 3 is an enlarged central sectional view of the chuck actuating means shown at the left of Figs. 1 and 2;

Fig. 4 is a vertical sectional view of the left end of Fig. 1;

Fig. 5 is a view similar to Fig. 4, being a substantial continuation thereof;

Fig. 6 is a view similar to Fig. 5, being a substantial continuation thereof;

Fig. 7 is a substantial continuation of Fig. 6 illustrating the right end of the machine;

Fig. 8 is a transverse, sectional view taken substantially in the plane of the line 8—8 of Fig. 4;

Fig. 9 is a sectional view taken substantially in the plane of the line 9—9 of Fig. 4;

Fig. 10 is a sectional view of the middle drive taken substantially in the plane of the line 10—10 of Fig. 4;

Fig. 11 is a sectional view taken substantially in the plane of the line 11—11 of Fig. 4;

Fig. 14 is a horizontal sectional view illustrating a part of the cross-slide spool and feed throw out mechanism;

Fig. 15 is a vertical sectional view of the parts shown in Fig. 14;

Fig. 16 is an enlarged detail view of a part of the main timing drum, and illustrating parts of a manual starting device;

Fig. 22 is a horizontal sectional view taken substantially in the plane of the line 22—22 of Figs. 6 and 7, the cam drum being in a different position;

Fig. 23 is a sectional view taken substantially in the plane of the line 23—23 of Fig. 7;

Fig. 24 is an enlarged detail sectional view of the cam drum detent and actuating mechanism;

Fig. 25 is an enlarged fragmentary sectional view illustrating a friction drive for the cam drum;

Fig. 30 is an enlarged detail sectional view taken substantially in the plane of the line 30—30 of Fig. 27;

Fig. 31 is a fragmentary view of the rear side of the rear end of the machine and illustrating part of the turret slide and reverse and index valve;

Fig. 36 is a diagrammatic view illustrating certain of the hydraulic connections and valves for controlling the actuation of the turret, cross-slides, cam drum detent, and various speed and feed devices.

Figure 17:
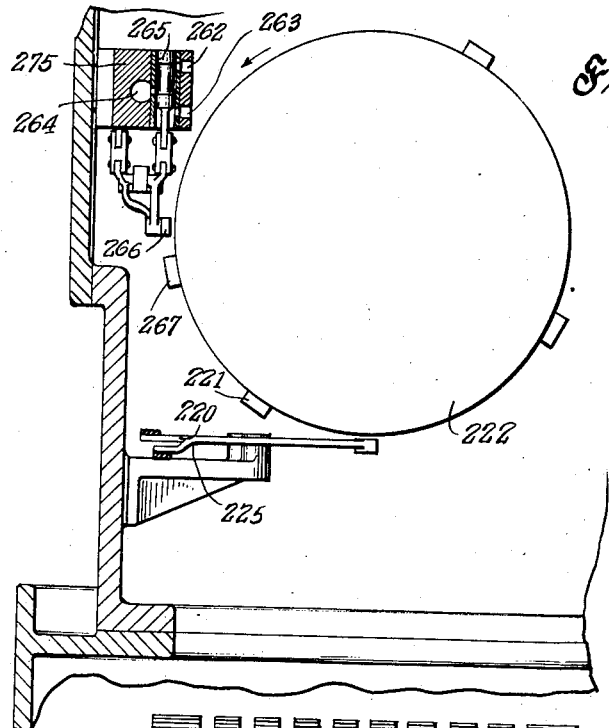
Fig. 17 is a detail sectional view illustrating a typical hydraulic pilot valve arrangement actuated by the timing drum.

The chuck and novel chuck actuating means at the left of Fig. 1 will first be described.

Referring to Figs. 1 to 5: 1 indicates a chuck which may be of any suitable type, the jaws of which are actuated by a draw rod 2 which passes through the sleeves 19, 20 (shown in Figs. 4 and 5), and is connected to or constitutes part of the piston rod 3. A cylinder 4 is fixedly connected to the main frame or part of the head-stock 5 of the lathe, and within the cylinder is a piston 6. C-rings or other packings 7 may be employed for effecting a relatively fluid-tight joint between the cylinder and piston. The piston is moved back and forth in the cylinder by a pressure fluid admitted and exhausted through the pipe connections 8—9. No particular change valve for controlling the fluid flow has been illustrated, since such valves and their application are well known in the art. During the reciprocation of the piston 6, the piston rod 3, and draw rod 2, which are connected together, will be moved with it and the chuck jaws opened and closed. The cylinder 4 and enclosed piston 6 are not adapted for rotation, but a slight rotation of the piston within the cylinder would do no harm. In the particular form shown, the rod 3 passes through and is guided in a sleeve 10, which may be keyed to the piston bore at 11. A C-ring or other suitable packing 12 provides a fluid-tight joint between the sliding sleeve 10 and the cylinder.

A rotatable connection is made between the chuck and piston. In the form shown, the draw rod 2 is threaded to the rod 3 and locked as by means of a lock nut 13. An antifriction bearing, such as the bearing having balls 14, is interposed between the end of the sleeve 10 and the collar or abutment 15 carried on the rod 3. The inner end of the piston rod 3 has an abutment collar 16 thereon between which and the piston is interposed an antifriction bearing such as the bearing having balls 17—17. The inner antifriction bearing and the inner end of the piston rod 3 are enclosed within a housing cap 18 secured to and forming a part of the piston 6. It will thus be seen that, during the admission and exhaust of pressure fluid to and from the cylinder 4, the inner bearing and sleeve 10 will be sealed from the head end of the cylinder. The antifriction bearings 14—17 are designed to permit a very free and substantially frictionless rotation between the piston 6 and the draw rod 2, during the rotation of the chuck. This construction avoids the necessity of providing fluid-tight joints between relatively rotatable parts. It has been common practice, heretofore, to provide a cylinder and piston rotable with the chuck. By reason of my present construction it is not necessary, in starting and stopping the rotation of the chuck, to overcome the substantial inertia of a rotating cylinder and piston. I believe I am the first to produce a fluid pressure actuated chuck in which the chuck is rotatable and the actuating piston and cylinder are non-rotatably mounted. The actuation of the chuck jaws will now be clear.

Chuck drive and speed change mechanism

The chuck is driven through a system of variable speed gearing, which, in the form shown, rotates continuously, while the chuck may be clutched and unclutched from this gearing system. I prefer to actuate the cross-slide feed, as well as the main turret feed, by the same gear system which rotates the chuck. The feeds above mentioned are operative only while the chuck is clutched so as to be rotating. Thus, when the chuck is unclutched so as to stop the same, both the cross-slide feed and the main turret feed are stopped, while the gearing may remain in motion.

In the form shown (Figs. 3, 4, 5) the chuck 1 is mounted upon a hollow spindle 20, which, at the rear of the headstock, may be supported on anti-friction bearings, such as the roller bearing 21. This bearing may be designed so as to take a part of the thrust of the chuck and another suitable thrust taking means may be provided at other end of the spindle. The spindle 20 may serve as a journal for the drive quill 19, which is rotated by means of a worm wheel 22, as will be later described. The sleeve 19 carries one clutch part 23, while a second sliding sleeve 24 carries a second clutch part 25. The sleeve 24 is splined or otherwise slidably connected to the chuck spindle 20, as by means of a key 26. The clutch sleeve 24 may be actuated by any suitable means for clutching and unclutching the parts 23—25 for starting and stopping the chuck 1. The clutch is such that, when the handle 27 is moved toward the right as seen in Fig. 4, it swings about its pivot point 28, and, through the linkage shown, carries the spool 29 toward the left. This movement permits the inclined face 30 carried by the spool to release the end 31 of the dog pivoted in a recess in the spool at 32. The end 33 of the dog, which was previously in contact with the abutment collar 34 carried by the chuck spindle 20 is now no longer held in contact therewith, and the sleeve 24 may then move toward the right and thus release the clutch faces 23—25. This action may be produced by a spring (not shown), if desired. When the handle 27 is moved toward the left, for example into the position shown in Fig. 4, the linkage carries the spool 29 toward the right, and the cam face 30 engages the ends 31 of the dog so as to press the same toward the center and thus cause the end 33 of the dog to engage the abutment collar 34, thus causing the clutch parts 23—25 to engage each other and thus causing the worm wheel 22 to drive the chuck. In the form shown, the dog is carried upon the pivot 32 supported upon ears on the sleeve 24 which are slidable within a slot in the spool 29, and in which slot the cam member 31 is located. The spool and drive sleeve 24 are thus splined to each other. This provision for driving the spool with the driving sleeve 24 is desirable for the reason that, on the spool 29, is mounted a driving gear 35, which constitutes part of the feed mechanism for the cross-slides, as well as for the main turret, as will be later described in detail.

A variable speed drive for the chuck and other parts will now be described. The power for driving all parts of the machine which are mechanically driven may be transmitted through the main drive shaft 40 by any suitable means, such as a belt. Referring particularly to Figs. 4 and 8 to 11, the main drive shaft 40 carries a gear 41, which may mesh with an idler gear 42, which in turn meshes with the gear 43. The gear 43 drives the shaft 44, which carries at its extreme end, a bevel gear 45 to drive the shaft for actuating what may be termed a fast traverse. This fast traverse has nothing to do with the chuck drive, and is merely mentioned incidentally at this point. The shaft 44 carries a worm 46 which meshes with and drives a worm wheel 47 carried by the shaft 48 (Fig. 9). The shaft 48 carries a drive gear 49, which meshes with the gear 50 on one portion 51 of an overrunning clutch rotatably mounted on the shaft 52. The gear 49 also meshes with a gear 53 carried by one friction clutch part 54 rotatable on a shaft 55. Obviously, the gears 50 and 53 are rotated by the gear 49 in the same direction. The other half 56 of the overrunning clutch may be keyed to the shaft 52, which latter carries a sprocket wheel 57. A second friction clutch part 58 may be keyed to the shaft 55, which latter also carries a sprocket wheel 59. A chain 60 is trained over both sprocket wheels 57 and 59.

Now, when the clutch parts 54—58 are disengaged from each other, the drive will be from the drive gear 49 and gear 50 through the overrunning clutch 51—56 to the shaft 52, sprocket 57, and to the chain 60. This will be a slow drive for the chain 60. When the friction clutch parts 58 and 54 are engaged with each other, the drive will be from the drive gear 49 to the gear 53 and through the friction clutch to the shaft 55, sprocket wheel 59, (larger than 57) and the chain 60. During this latter action, the chain, being trained over both sprockets 57—59, will cause the sprocket 57 to rotate more rapidly and simply run ahead of the overrunning clutch part 51. Thus, two speeds may be imparted to the chain 60. While chains are disclosed herein, it is to be understood that any other type of gearing would be equally effective.

The friction clutch is preferably actuated by hydraulic means 61 shown more in detail in the upper part of Fig. 8. This hydraulic actuator may be regarded as typical of others for shifting clutches to be hereinafter mentioned.

The chain 60, which, as stated, may be moved at either of two different speeds, depending upon the position of the friction clutch, extends upwardly and is trained over the sprocket wheel 62 carried by the shaft 63 (Fig. 10). This shaft is connected as by means of spur gears 64 to a shaft 65, and the shaft 63 at its opposite end is connected as by means of spur gears 66 to a shaft 67. A friction clutch 68 is provided on the shaft 67 and may be similar to that heretofore described in connection with Fig. 9. An overrunning clutch 69 may be provided for the shaft 65 and may be the same or similar to that heretofore described in connection with Fig. 9. The gears 64 and the gears 66 serve to rotate the respective shafts 65 and 67 at different rates of speed. The overrunning clutch 69 serves at times to rotate a sprocket wheel 70 over which is trained a chain 71. The friction clutch 68 at times serves to rotate a sprocket wheel 72 over which is trained a chain 73. The chains 71—73 may thus be driven at different speeds. The gears 66 are change gears, and, by substituting gears of a different ratio, various speeds may be obtained with the arrangement shown in Fig. 10. The friction clutch 68 is actuated by means of an hydraulic actuator, which may be the same as that heretofore described.

The chain 71 extends upwardly, and is trained over a sprocket 74 (Fig. 11) on one part of an overrunning clutch 75, which may be the same or similar to that heretofore described. The chain 73 extends upwardly, and is trained over a sprocket 76, which may be connected to one-half of a friction clutch 77, which may be the same or similar to that heretofore described. The shaft 78 carrying the overrunning clutch 75, through suitable gears 79 may drive the worm shaft 80 carrying the worm 81, which worm meshes with the worm wheel 22, which is the ultimate drive to the chuck drive quill 19. The shaft 82, which carries the friction clutch 77, is connected by suitable gears 83 with the worm shaft 80. The gears 83 are preferably change gears so that gears of various speed ratios may be substituted when desired. The friction clutch 77 is preferably actuated by hydraulic means, the same or similar to the hydraulic actuator 61 heretofore described. Thus the worm shaft 80 may be rotated at one speed from the chain 71 and at a different speed from the chain 73.

The change gears 66 may be located in a housing 85 provided with a removable cover plate 86 to permit ready access to the gears for the purpose of substituting gears of different speed ratios. The change gears 83 may be correspondingly housed in a housing 87 provided with a removable cover plate 88. Access to the ends of the shafts 48, 52 and 55 may be had through cover caps 89 in a removable housing 90 (Figs. 1, 8), which housing may bodily carry the bearings for, and the shaft 44, so that the same may be removed with the housing 90, and access to the mechanism inwardly of the shaft 44 easily obtained. The gears 64 may be located in a housing 91 provided with a removable cover plate, and the gears 79 located in a similar housing 92.

The hydraulic actuators 61—61 may be on the outside of the machine, where they will be readily accessible, as will be clear particularly from Figs. 1 and 8.

It will thus be seen that with a constant speed main drive shaft 40, two different speeds may be secured in the lower gear train shown in Fig. 9. Two other different speeds may be obtained through the middle gear train shown in Fig. 10, and two more different speeds may be obtained through the upper gear train shown in Fig. 11. Thus, without changing any set of change gears, and merely by manipulating the friction clutches 58, 68 and 77, eight different speeds may be imparted to the worm shaft 81, and, consequently to the chuck.

The friction clutches which as stated are preferably actuated by hydraulic means, may be, and preferably are, automatically controlled so that when different operations are being performed on the work-piece, almost any desired speeds may be imparted to the chuck. By altering the change gears, the speeds may be varied so as to accommodate work-pieces having different characteristics requiring different speeds.

While the invention has been disclosed as embodying chain gears, it is to be observed that, in place of the chains, direct gear connections may be employed. The principles of the invention, however, may perhaps be more readily grasped with the parts further separated as when connected by chains.

The cross-slides and feeds

The cross-slides and associated mechanism are shown more particularly in Figs. 1, 2, 5, 12, 13 and 14. I may employ two cross-slides, one at the front and one at the rear. The term "cross-slide" is used generically, for the front cross-slide as shown is truly a slide, while the one at the rear is pivotally mounted and consequently swings the tool. However, I term both forms "cross-slides" since they are designed to perform similar functions.

The front cross slide 95, and the rear cross slide 96, may be mounted upon a carriage 97 slidable for adjustment upon the ways 98 on the bed of the machine. This carriage during the operation of the cross-slides is preferably fixed in position by any desirable means. The front cross-slide 95 is slidable in and out upon transverse slideways 94 on the main slide 97.

The slide 95 is moved inwardly or in the working direction by hydraulic means, which, in the form shown, embodies a cylinder 99 carried by the cross-slide 95. A piston rod 100 is secured to the cross-slide carriage 97 and carries a piston 101 movable within the cylinder 99. Pressure fluid, such as oil, is alternately admitted and exhausted to and from opposite ends of the cylinder 99, and the cross-slide 95 is accordingly reciprocated, as will be well understood. The pressure fluid connections are shown diagrammatically in Fig. 36 and may embody either flexible tubing or telescoping pipes. Suffice it to say at this point that the admission and exhaust of the pressure fluid may be controlled by pilot valves (see Fig. 17 for details of a typical valve), which are preferably automatically actuated at the proper points during the cycle of the machine.

While the cross-slide 95 is being moved inwardly, that is, in the working direction, by fluid pressure, the movement is not unrestrained for the reason that with certain tools and work-pieces having certain characteristics, the tool would move too rapidly, and there would be no adequate control over the character and depth of cross cut. I restrain the movement of the cross-slide 95 by suitable mechanically actuated means. In the form shown the cross-slide 95 carries a rack 102, which meshes with a segment gear 103 pivotally mounted at 104 on the main cross slide carriage 97. The segment gear 103 has an arm 105, which is pivotally secured to a connecting rod 106. The lower end of the connecting rod is pivotally connected at 107 to an arm 108 carrying a gear 109 on a journal shaft 110. This gear 109 meshes with a rack 111 slidably mounted in a guide 112 carried by the main frame of the machine or some other suitable part. The rack 111 is connected to or forms part of a cam follower 113, which is adapted to engage the face of a cam 114, carried by a rotating part, such as the shaft 115. The shaft 115, carrying with it the cam 114, is rotated at a predetermined rate, which rate, however, may be varied to meet varying conditions, as will be later described. Now, during the operation of the device, fluid pressure is admitted on the left hand side of the piston 101, so as to urge the cross-slide 95 inwardly. The cross-slide thus moves inwardly until the rack and pinion mechanism heretofore described causes the cam follower 113 or a roller 116 thereon to engage the cam 114, if the follower and cam are not already in engagement. The rate of movement of the cross-slide 95 is thus determined by the speed and particular characteristics of the cam 114. Thus, by varying the speed or the cam contour, any desirable rate of feed may be secured for the cross-slide 95. The tool carried by the cross-slide will be urged inwardly under the influence of pressure fluid thereby securing the smooth action of pressure fluid means, and yet the movement or feed is mechanically restrained and controlled so that the desired rate of feed will be obtained. The tool resistance, of course, acts against the fluid pressure and thus the cam 114 and the connection between the cam and the cross-slide 95 serve primarily as guiding means, and the forces exerted thereon are reduced as compared with a construction in which the cross-slide tool is fed inwardly by mechanical means. The parts are, therefore, subject to a minimum of wear, and the accuracy of the machine is thus increased.

The rear cross-slide 96 does not slide strictly, but swings about a pivot shaft 117 on the cross-slide carriage 97. The cross-slide 96 is rocked about the shaft 117 by hydraulic means, which, in the form shown, includes a fixedly mounted piston member 118 and a cylinder 119 rotatably mounted about the piston. A link 120 is pivotally connected at 121 to the cylinder 119 and to a part of the cross-slide 96 at 122. Pressure fluid is alternately admitted and exhausted to and from the cylinder 119 at opposite sides of the piston 118, and the cylinder thus oscillated. The fluid pressure connections are shown diagrammatically in Fig. 36. During the oscillation of the cylinder, the cross-slide 96 is rocked through the medium of the link 120.

Oscillating movement of the cross-slide 96 is not unrestrained, but is resisted in one direction by cam means similar to that heretofore described. In the form shown, an arm 123 carried by the shaft 117, or otherwise associated so as to move with the cross-slide 96, is pivotally connected at 124 to a connecting rod 125, which at its lower end is pivotally connected at 126 to an arm movable with a gear 127. This gear 127 meshes with a rack 128 carried by a resisting cam follower 129, which is guided in a housing 130 on the main frame of the machine or other suitable part. The inner end of the cam follower 129, or a roller 131 carried thereon, is adapted to engage a cam 132, which may be carried upon the shaft 115 heretofore mentioned. Now, when the pressure fluid begins to rock the slide 96 in the working direction, the cam follower 129 or the roller 131 thereon is urged into engagement with the cam 132, if these elements are not already in engagement. During the rotation of the shaft 115 and cam 132, the follower 129 is permitted to move inwardly at a speed dependent upon the speed and characteristics of the cam. Thus, the cross-slide 96 may be guided and controlled in its movement, and the desirable results heretofore described in connection with the front cross-slide 95 are likewise attained at the rear cross-slide.

While one strictly sliding and one oscillating cross-slide have been disclosed, it is, of course, within the contemplation of my invention to use either type, or both types, or only one cross-slide, depending upon the results to be attained. Generally speaking, an oscillating cross-slide is more accurate and perhaps subject to less wear than a true sliding cross-slide.

The actuation and control of the cross-slide feed cams 114, 132 will now be described. As will be noted particularly in Fig. 5, the shaft 115, in addition to carrying the cams 114 and 132, carries a worm wheel 135, and what may be termed a cross-slide cam spool 136. The cross-slide cam spool carries a plurality (only two shown) of circumferentially adjustable dogs 137 for actuating pilot valves, as will be later described. These pilot valves serve to control the admission and exhaust of fluid pressure to and from the cross-slide actuating cylinders. While it has been indicated that pressure fluid is admitted and exhausted alternately to both sides of the cross-slide pistons, it is to be noted that, if desired, the pressure fluid need only be employed for urging the cross-slides in the working direction, and that the cams 114, 132 might be employed for returning the two cross-slides to their retracted positions.

Figure 12:
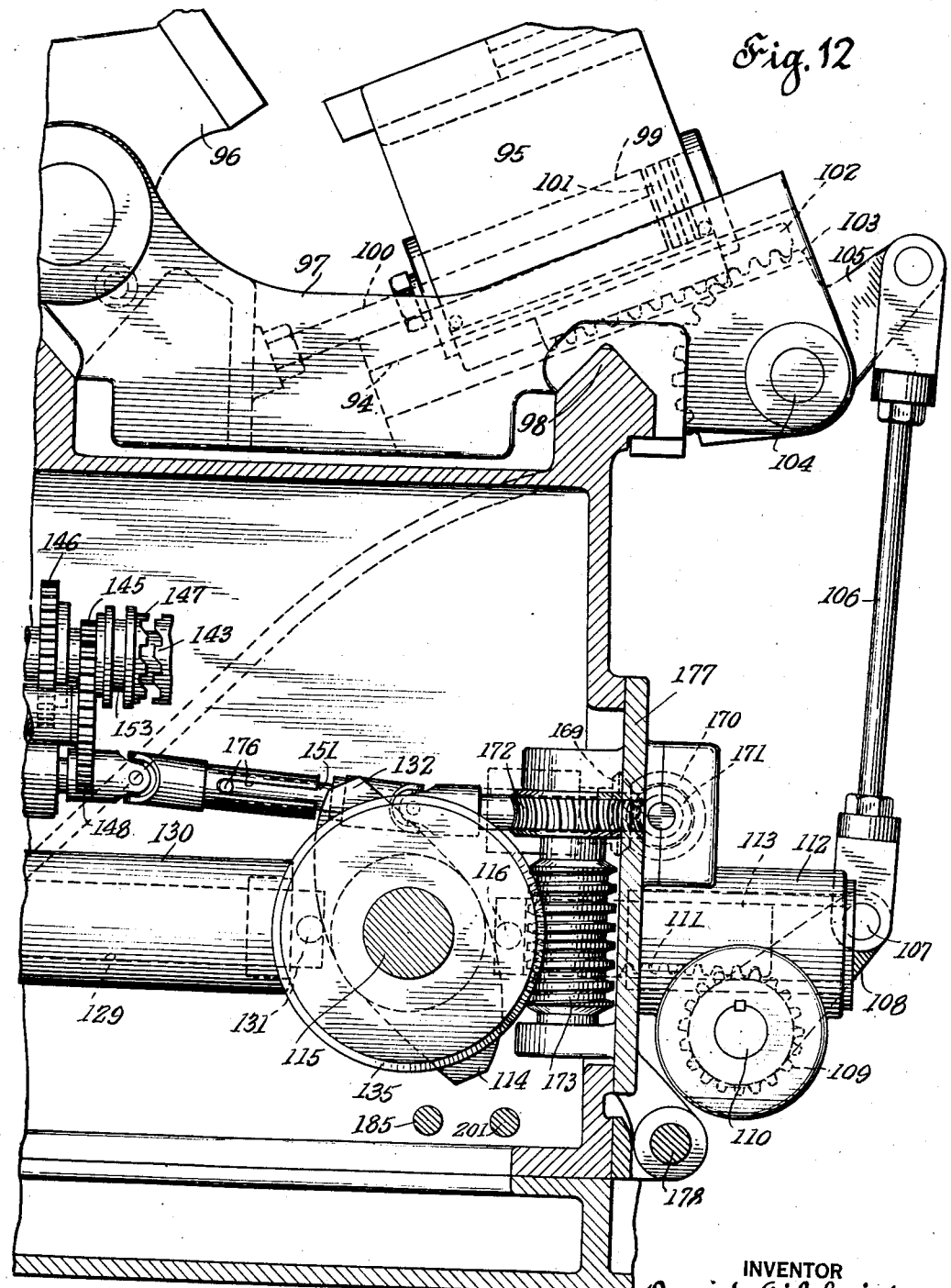
Fig. 12 is a fragmentary transverse sectional view through the machine, illustrating the front cross-slide and part of the rear cross-slide.
Figure 13:
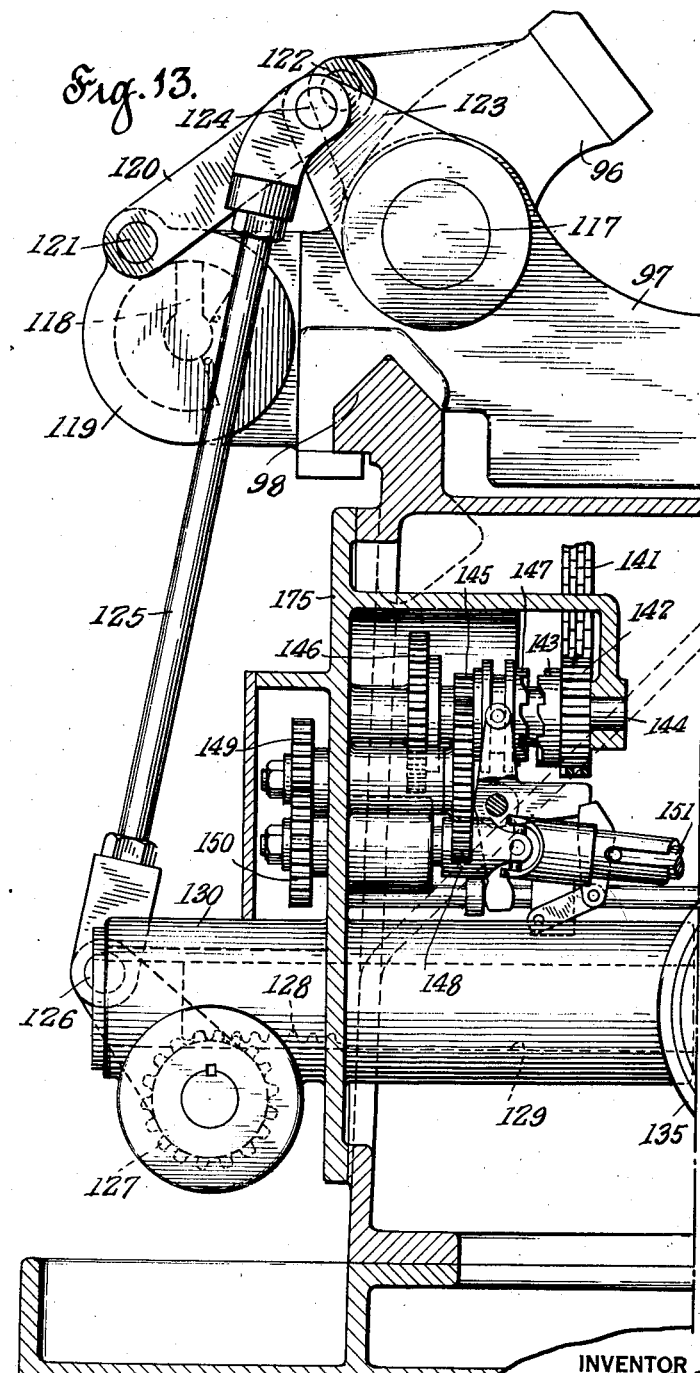
Fig. 13 is a view similar to Fig. 11, but illustrating the rear cross-slide.

Referring particularly to Fig. 5, it will be noted that the spur gear 35 on the chuck spool 29 is rotated with the spool at all times, while the chuck 1 is rotated. The gear 35 meshes with a long gear 138 on a stub-shaft carried by the frame of the machine. A bevel gear 139 rotatable with the gear 135 meshes with a bevel gear 140, which is geared to the driving mechanism for the cams 114, 132, and associated parts. In the form shown, I illustrate a driving chain 141 trained over a sprocket (not shown) but rotatable with and by the bevel gear 140. This chain 141 serves to rotate a sprocket 142 carrying one part 143 of a clutch (Figs. 13, 14). This clutch part 143 may be freely rotatable upon the shaft 144 constituting part of a gear set. The shaft 144 or a quill thereon carries a spur gear 145 and may also carry a second spur gear 146 of a different size. A second clutch part 147 is keyed to the shaft 144 or to the quill carrying the gears 145—146 so that when the clutch part 147 is moved into engagement with the rotating clutch part 143, the gears 145—146 will be rotated. The gear 145 meshes with a gear 148 on a shaft which carries at its outer end a change gear 149. The change gear 149 meshes with a second change gear 150 carried upon a shaft which rotates the cross-slide cam shaft 151 in the present instance through a universal joint as shown in Figs. 12 and 13. By changing the gears 149—150 for gears of different ratios, various speeds may be imparted to the driving shaft 151, as will be understood. The gears 145—146 are not used simultaneously. If the gear 145 is in use as just described, the gear 146 is merely an idler. If the gear 146 is to be used it is meshed with the gear 152 (see Figs. 5 and 15), which in turn would drive the change gears 149—150, as will be understood. This construction provides for a ready means of further increasing the range of speeds of the shaft 151.

Referring now particularly to Figs. 5, 13, 14 and 15, it will be seen that the clutch part 147 is moved by means of a spool 153, which is actuated by a lever 154 pivotally mounted at 155. The lever 154 or the shaft 155 to which it is connected, carries a shifting arm 156, which is positioned between spaced abutments 157—158 upon a sliding shaft 159. The shaft 155 carries an arm 160 which when raised serves to rotate the shaft 155 and throw the clutch part 147 to a position out of engagement with the clutch part 143. This throwing out of the clutch may be automatically effected by means now to be described. The shaft 155 has loosely mounted thereon an arm 161 which pivotally carries thereon at 162 a dog 163, which is adapted to engage the arm 160, for a purpose to be described. The lower end of the dog 163 is connected as by means of a link 164 to the abutment 158, or other part movable with the shaft rod 159. The cross slide cam spool 136 or other part on shaft 115, carries a camming member 165, which is in a position at times during the rotation of the cam spool to engage the arm 161 or the roller 166 carried thereby.

The shift rod 159 is movable in one direction by means of an arm 167 carried upon a manually actuated shaft 168, as will be clear from Figs. 15 and 16. With the parts in the position shown in Figs. 13, 14 and 15, the clutch parts 143—147 will be out of engagement with each other, and the cams 114—132 will not be rotated. Now, when the manually actuated shaft 168 is moved so as to shift the shift rod 159 toward the left as viewed in Fig. 15, the link 164 first serves to swing the dog 163 about the pivot 162 so as to disengage the upper end of the dog from the arm 160. Further movement of the shift rod 159 toward the left carries the abutment 158 against the fork 156, and serves to throw the clutch part 147 toward the right and into engagement with the coacting clutch part 143. The chain 141 then serves to rotate the gears heretofore described and rotate the shaft 151.

The shaft 151 carries a bevel gear 169 (Fig. 12) meshing with a corresponding bevel gear 170 of a gearset. Rotatable with the bevel gear 170 is a worm 171, which meshes with a worm wheel 172. The worm wheel 172 serves to rotate a worm 173, which in turn meshes with the worm wheel 135 carried by the shaft 115, and thus serves to rotate the cams 114—132, and the cross-slide cam spool 136.

During the rotation of the feed cams and spool 136, the cross-slides are fed in under the influence of the pressure fluid, as heretofore noted, and the inward movement is resisted by the cams 114—132. When the desired movement of the cross-slides has been effected as determined by the positions of the cams 114—132, the cams or dogs 137, which have been set previously, will reverse the flow of pressure fluid to the cylinders 99, 119 and retract the cross-slides. The cross-slides may be operated together or independently merely by positioning the cams 137 properly. The cams 114—132 continue to rotate until the adjustable knock off dog or cam 165 (Fig. 15), which has been previously positioned in predetermined location, engages beneath the roller 166 and raises the arm 161 and dog 163 so that the dog 163 having come into position so as to engage beneath the arm 160, raises the latter and throws the clutch part 147 out of engagement with the rotating clutch part 143. The cross-slide cycle of operation is then complete. It should be stated that, after the shift rod 159 is moved toward the left so as to throw the clutch parts into engagement and cause the cross-slide cams to be rotated, the cam dog 165 moves out from beneath the roller 166, and the arm 161 then falls down in position to be again reset upon being engaged by the cam dog 165. After the clutch has been thrown in by the shift rod 159, the shaft 168, which serves to move the shift rod 159, is immediately rotated back slightly so as to draw the shift rod 159 back almost to the position shown in Fig. 15. This return movement sets the dog 163 so that it is directly beneath the arm 160, so that when the cam dog 165 on the slide cam spool 136 engages beneath the roller 166 the clutch is thrown out as heretofore described.

It will be clear that after the cross-slides have performed their operations the latter are retracted and the rotation of the slide cam spool and the cams, is automatically stopped. The next cycle of the cross-slides is initiated by a manual rocking of the oscillating shaft 168. Thus, the cross-slides may finish their operations and be retracted and remain in retracted position before the other operations performed by the lathe have been completed. On the other hand, it is possible that the operations performed by the cross-slides may occupy the entire time occupied for performing the other operations.

Now, for the purpose of securing easy access to the various gear boxes and other mechanism associated with the cross-slides, I prefer to mount the gear set shown more particularly in Fig. 13 upon a plate 175, which is removably secured to the main frame of the lathe by any suitable means. The guide boss 130 for the plunger 129, and with it the plunger, are all carried by this removable plate 175 so that when the plate is removed the gear set and all parts associated with the plate are removed with it. In order to permit this removal, the shaft 151 is preferably made in parts joined together as by means of a pin and slot connection 176, as illustrated particularly in Figs. 12 and 13. That part of the slide cam spool and cam driving mechanism mounted at the front part of the lathe is also preferably carried by a plate 177, which may be hingedly connected at 178 to the main frame of the lathe. The worm 173, as well as the gearing for operating the same, are all carried by the plate 177 so that when it is swung down out of the way, ready access may be had to the interior so as to expose the cams, slide cam spool, and other interior parts. The plunger housing 112 heretofore described is also preferably carried on the hinged portion so as to swing down therewith.

*Fast traverse*

As has been indicated, the turret is moved back and forth relatively to the work by fluid pressure means, and the movement of the turret on its forward stroke is resisted and controlled by feed means such as a main cam drum 180. This cam drum has on the surface thereof one or more guide cams of the desired characteristics, as will be later described. The speed of the cam drum may be varied, so as to impart to the turret the proper feed for any particular operation being performed at any particular time. I preferably employ what may be termed a slow traverse or feed for the cam during the performance of the various operations on the work and this slow traverse may be, and preferably is, at variable speeds, as heretofore indicated, and as will be later described. In such instances, when it is desired to rotate the cam drum at a high speed, for example, when the tool operations have been completed and it is desired to bring the cam drum back to its initial position or into any other desired position where tools again are to perform their operations, I may employ what I term a fast traverse or fast speed for the main cam drum, and this fast traverse is preferably at a constant, relatively high, rate of speed. The fast traverse, which has a more or less direct connection to the cam drum 180 will now be described.

As has been described, power is transmitted to the main drive shaft 40 (Fig. 4) through the gears 41, 42 and 43, and then finally to the bevel gear 45. The bevel gear 45 meshes with a bevel gear 181 on a connecting shaft 182, carrying at its lower end another bevel gear 183 meshing with a bevel gear 184 on a fast traverse shaft 185. This fast traverse shaft is in rear of the shaft 201 over which the chain 200, shown in Fig. 4, is trained and is independent of that slow traverse shaft 201. The fast traverse shaft 185 passes toward the rear end of the machine (Figs. 5 and 6) and is connected, as by means of a double universal joint 186 (Fig. 6) to a worm shaft 187. The worm shaft 187 is independent of the shaft 210 which forms part of the slow traverse to be later described. The worm 188 on the shaft 187 meshes with a worm wheel 189, (Figs. 6, 20, 21) which carries a clutch part 190, both the worm wheel 189 and the clutch part 190 being freely rotatable upon the shaft 191. A clutch sleeve 192 is splined to the shaft 191 and carries a second clutch part 193, for engagement with the clutch part 190. Thus, when the clutch sleeve 192 is moved so as to cause the clutch faces 190—193 to engage each other, the rotation of the worm shaft 187 rotates the worm wheel 189 and both clutch parts 191 and 193. Through the key or spline connecting the clutch sleeve 192 and the shaft 191 the latter is rotated. The shaft 191 carries a spur gear 194, meshing with a second spur gear 195. The spur gear 195 is secured to a worm shaft 196, carrying a worm 197, which worm meshes with the main driving worm wheel 198, secured to the feed cam drum 180. Thus, what I term the fast traverse may drive the cam drum.

*Slow traverse*

As above stated, the feed cam drum is usually rotated during the times that the tools are performing their operations by means of a slow traverse, which slow traverse may be, and preferably is, at variable speeds, to efficiently accommodate tools and work of certain character.

The slow traverse, which drives the cam drum through the same main worm wheel 198 as does the fast traverse, receives its drive, not directly from the main drive shaft, as does the fast traverse, but the slow traverse drive in this instance is taken from the drive gear 35 on the chuck sleeve (Fig. 5). Thus the slow traverse or normal turret feed control operates only while the chuck rotates. The same may be said of the cross-slide feeds as above described. The stub shaft of the gear 138 (Fig. 5) as shown carries a sprocket wheel, over which is trained a chain 200, which extends downwardly and is trained over a corresponding sprocket wheel on the slow traverse shaft 201, shown at the lower right-hand corner of Fig. 4 and located in front of the fast traverse shaft 185. The slow traverse shaft 201 passes rearwardly (Figs. 4, 5, 6, 7) along the same general line as the fast traverse shaft 185.

The shaft 201 actuates a gear set, designated generally 202 (Fig. 23) at the rear end of the machine. From the gear set 202 a second gear set, designated generally 203 (Figs. 7, 23) at the rear side of the machine, is driven as by means of a chain 204, trained over sprockets in the two gear sets. Since the gear sets 202 and 203 are preferably substantial duplicates of each other, except for gear ratios, only a single set need be described, and the set 203 as shown particularly in Fig. 7, will now be described. The shaft 205 is driven in the rear gear set by means of the chain 204, and the corresponding shaft in the front gear set is driven by the shaft 201 heretofore mentioned. The shaft 205 carries the spur gear 206, fixedly mounted thereon, which spur gear meshes with a second gear 207 on one part of an overrunning clutch, designated generally 208. Thus, when the slide clutch 209 is in the neutral position, as shown in Fig. 7, power transmitted to the shaft 205 acts directly through the gears 206 and 207, and the overrunning clutch is driven so as to rotate the shaft 210, which leads forwardly into a gear set, which will be described. This may be the slow speed transmitted to the shaft 210. The shaft 205 carries a loosely mounted gear 211, which carries with it one part 212 of a clutch. The gear 211 meshes with a gear 213 on the jack shaft 214, upon which the overrunning clutch 208 is mounted. The clutch spool 209 is splined to the shaft 205, so that when the clutch face 212 and that on the slide spool 209, are in engagement, the power transmitted to the shaft 205 will be transmitted through the gears 211, 213, and then to the shaft 210. This may be a faster speed, in which case the clutch 208 simply overruns or ratchets, while the gear 206 is driving the gear 207 at its normal speed. The shaft 205 also carries a loosely mounted larger spur gear 215. One part 216 of a clutch is movable with the gear 215 and is adapted to coact with a corresponding clutch part on the sliding sleeve 209. The gear 215 meshes with a pinion 217 on the shaft 214. Therefore, when the clutch sleeve 209 is slid toward the right, as viewed in Fig. 7, so as to bring the clutch part thereof into working engagement with the clutch part 216, the power transmitted to the shaft 205 will be transmitted through the gears 215, 217 to the shaft 214. This is the highest speed, in which case the clutch 208 simply overruns and the gears 211, 213 simply idle. Thus, three speeds are possible in each of the gear sets 202, 203, and by combining the various speeds in the two gear sets a great many different speeds may be obtained, without the necessity of any change in gears.

The clutch sleeves, as 209, of both the front and rear gear sets 202, 203 are preferably mechanically actuated by adjustable dogs carried by the control drum 222 to be later described. In the form shown I mount a shaft 218 in the frame of the lathe, and on this shaft is an oscillating clutch shift arm 219, which is rotatably mounted upon the shaft 218. A link and lever system 220 (Figs. 17, 19) is actuated by dogs, such as 221 on the control drum 222. An arm 223 is keyed to the shaft 218, and a clutch shift fork 224 is also keyed to the shaft 218. A second link and lever system 225 is actuated by adjustable dogs, such as 221, on the control drum 222. Thus during the rotation of the timing or control drum 222 the dogs such as 221 which are suitably and adjustably spaced serve to control the two gear sets and vary the rotative speed of the shaft 210.

The shaft 210 (Figs. 7, 20) is connected to a worm shaft 226, the worm of which meshes with a worm wheel 227, which carries one part 228 of a clutch. The worm wheel 227 and clutch part 228 are both mounted on a shaft 229, which is in alignment with, but free of, the shaft 191 heretofore described in connection with the fast traverse. The shaft 226 carries a change gear 230, meshing with a corresponding change gear 231, mounted upon a jack shaft 232, having a worm thereon meshing with a worm wheel 233, also mounted on the shaft 229. The worm wheel 233 carries a clutch part 234. A sliding clutch member 235, having clutch faces for engagement with the two clutch parts 228 and 234 at different times, is splined to the shaft 229. The clutch sleeve 235 may be actuated and controlled by hydraulic means, to be described.

When the clutch members 228 and 235 are in engagement, power transmitted to the shaft 210 will serve to drive the worm wheel 227 and with it the clutch part 235. The clutch part 235, being splined to the shaft 229, will of course, cause it to rotate. When the clutch parts 234 and 235 are in engagement, power transmitted to the shaft 210 will be transmitted through the worm shaft 226 to the change gears 230, 231. The worm 232 will then be rotated, so as to rotate the worm wheel 233 and with it the clutch parts 234, 235 and the shaft 229. Thus, by providing change gears 230, 231 of the proper ratio, two different speeds may be imparted to the shaft 229, in addition to any other speed variations possible by reason of the gear sets already described.

The shaft 229 has secured thereon a clutch part 236, for engagement with the clutch part 237 on the clutch sleeve 192. This clutch sleeve 192 fits over the end of, but is rotatably free of, the shaft 229. Now, when the clutch sleeve 192 is shifted toward the left, as viewed in Fig. 20, so as to cause the clutch parts 236, 237 to be in engagement with each other, power transmitted to the shaft 229 will be transmitted through the clutch parts 236, 237 to the shaft 191 by reason of the splined connection between the clutch sleeve 192 and the shaft 191. Thus, the shaft 191 is rotated, and in rotating drives the worm wheel 198 and feed cam drum 180 by the means heretofore described.

It will be understood that the slow traverse last described will usually be utilized during the times the tools are operating on the work pieces, while the fast traverse may be employed for returning the cam drum to the initial or any predetermined position during various times in the cycle of the machine.

*Feed cam drum, timing drum and controls*

As has been stated above, the turret is moved forward relatively to the work by hydraulic means, and this movement is resisted by mechanical feed means. In the form shown the turret slide carries a cam follower or roller 240, which is urged against the cam 241 on the main cam drum 180. The cam, which may be in one or more parts and interchangeable with other cams if desired, is of such characteristics that the turret will be fed forward and such feed qualified not only by the cam but also by the speed of the main cam drum, as heretofore described.

The cam drum 180 and the timing or control drum 222 are geared to each other, so that the same rotative relation is normally maintained between these two drums. In the form illustrated, wherein I employ a 6-tool turret, the cam drum and control drum are geared in a six to one ratio, that is to say, for each cycle of the machine the cam drum rotates six times, while the control drum rotates once. Of course, by employing a number of cams on the cam drum this relationship could be varied, but I prefer to employ the gear ratio as above described. This gearing (Figs. 6, 22, 23) may comprise a pinion 242 on the main cam shaft 243. This pinion may mesh with a gear 244 on a jack shaft 245. The jack shaft 245 may carry a pinion 246, which meshes with a spur gear 247 on the control drum shaft 248. The gear ratio is such that the cam drum makes six revolutions to one revolution of the main control drum for each cycle as above described.

Figure 20:
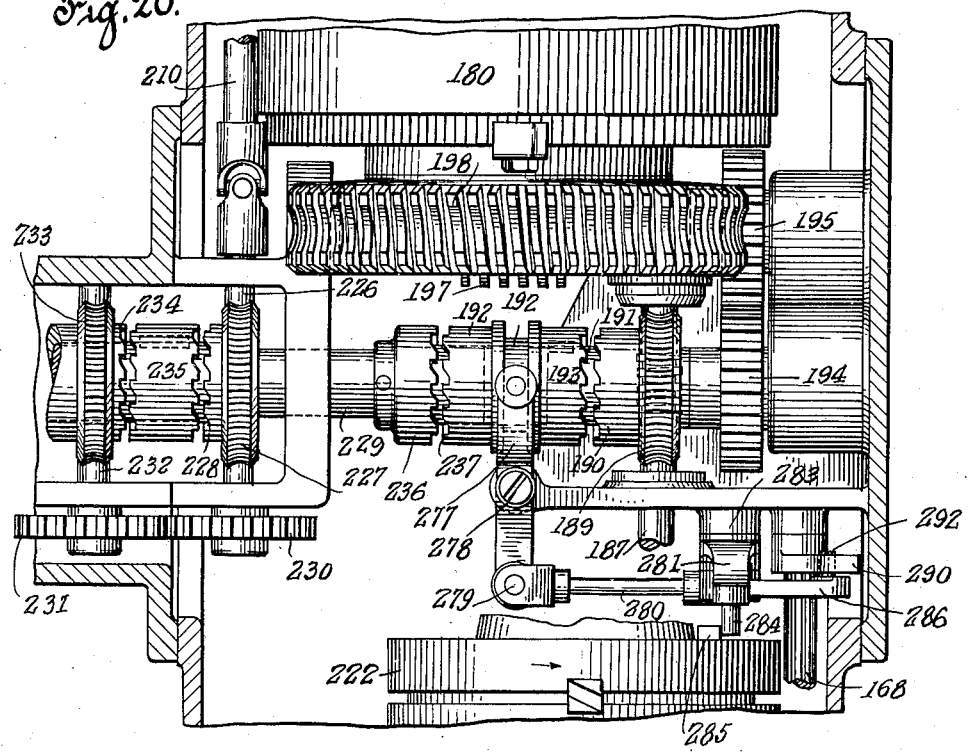
Fig. 20 is a horizontal view illustrating the final drive to the cam drum and clutch devices associated therewith.

As above indicated, the drive for the main cam drum, and consequently for the control drum, is through the worm wheel 198 (Figs. 20 and 25). For control purposes, as will be later described, the worm wheel 198 drives the cam drum 180 by friction means. In the form shown, the worm wheel 198 is secured upon a friction ring 249, which fits upon a reduced neck portion 250 of the cam drum. Friction washers 251 may be interposed between a shoulder on the cam drum and a friction ring 252 carried upon the reduced portion 250 of the cam drum. The backing ring 253 may be secured to the cam drum, and a spring 254 may serve to urge the friction ring 252 toward the right, as viewed in Fig. 24, so as to cause the worm wheel 198 to drive the cam drum with the requisite frictional force. This friction drive is an advantageous feature, in that the drive, that is, the gearing of the fast and slow traverses, may continue and the cam drum and control drum may be stopped, in order that the movements of the turret may be accurately synchronized with the movements of the cam and control drums.

Figure 18:
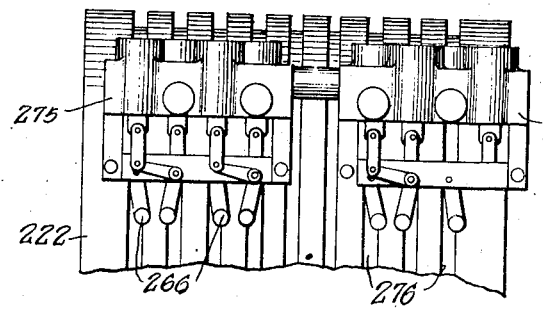
Fig. 18 is a fragmentary view of the timing drum and a plurality of hydraulic pilot valves in position.
Figure 19:
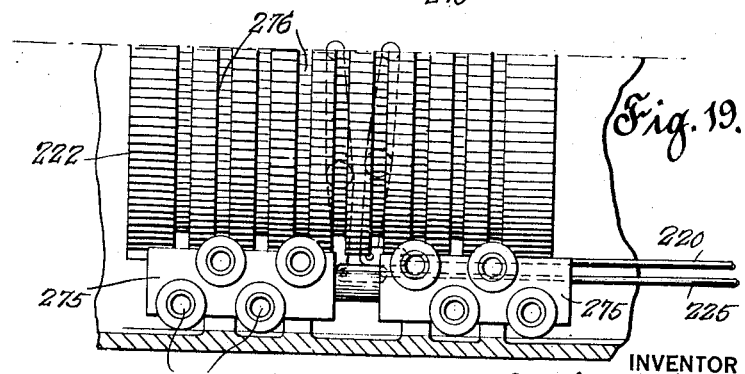
Fig. 19 is a view similar to Fig. 18, but viewed at right angles thereto, and illustrating, in addition, mechanical clutch actuators.

A means for stopping the rotation of the cam and control drums (while the traverse gearing may continue to rotate) once each time the turret is indexed, except in those cases when the forward turret movement is exactly synchronized and in time with the rotation of the cam drum, may be as follows:

The cam drum 180 is provided peripherally with serrations 255 (Figs. 24, 25), for adjustably holding a dog 256, which may be adjusted around the periphery to the desired point. A detent 257 is adapted to be projected into the path of movement of the dog 256, and when the detent is in projected position the rotation of the cam drum 180 and the control drum 222 will be arrested but the driving means need not be thrown out, because of the presence of the friction drive between the worm wheel 198 and the cam drum 180. The position of the detent 257 is dependent upon the movement of the turret, and until the turret has reached a predetermined position, the detent remains in projected position. In the form shown, the detent 257 is carried by a sliding member having a piston 258 and a larger piston 259 fitting in cylinders, as shown, for example, in Fig. 24 (see also Fig. 2). A pressure fluid connection 260 is made to the cylinder in rear of the piston 258, and a fluid pressure connection 261 is made to the cylinder in rear of the large or retracting piston 259. Pressure is admitted through the connection 260 by means of a pilot valve, a typical example of which is shown in Figs. 17, 18 and 19. In the pilot valve shown in Fig. 17 a pressure fluid connection may be made to a port 262, while the port 263 may be an exhaust port. The port 264 may be connected to the port 260 (Fig. 24). It may be stated here that pilot valves of the type just described are employed for many of the hydraulic functions of the present machine. The valve member 265 may be moved up and down by means of suitable links, actuated by a tappet 266. This tappet is actuated by dogs, such as 267, on the control drum 222. In the form shown these dogs have inclined slots 268 (Fig. 6) for guiding the tappet to the right or left, thus changing the position of the valve 265 from pressure admission to exhaust, and vice versa. Thus, during the rotation of the cam drum and of the control drum, one pilot is shifted so as to admit pressure fluid, to force the piston 258 and detent 257 into projected position, so as to arrest the rotation of the cam drum when the dog 256 engages the detent 257. A second pilot valve arrangement as above described is connected to a port 270 in the valve casing 271, supported on the main frame, as shown more particularly in Figs. 2 and 24. A piston valve 272 is slidable within the cylinder and is preferably urged upwardly, as by means of a spring 273, so as to normally cause the valve to close communication through the connection 261, regardless of the pressure condition through the port and passage 270. Now, during the continued rotation of the control drum, a second dog, of the character heretofore described as 267, acts to admit pressure fluid through the port 270, but with the piston valve in elevated position, as shown in Fig. 23, no pressure fluid can pass out of the cylinder and into the connection 261. Some time thereafter, or even before, the pilot valve controlling fluid pressure into the port may be exhausted, but since the detent has been projected it will remain in that position. Now, if the piston valve 272 be depressed so as to connect the port 270 with the connection 261, pressure fluid will pass into the cylinder behind the retracting piston 259 and retract the detent. Since it is the function of this detent to synchronize the cam drum with the movements of the turret, I provide an adjustable wedge or slide 274 on the turret slide. This slide may be moved to various positions on the turret slide longitudinally of the machine. By positioning the dog 256 and the slide 274, any desired synchronism between the cam drum and the turret may be effected. When the turret moves forward the slide 274 will depress the piston 272, and pressure fluid will then pass through the connection 261 and force the piston 259 toward the right, thus retracting the detent 257. As soon as this is accomplished the dog 256 is released and the friction drive from the worm wheel 198 starts the rotation of the cam drum and the control drum. At any time thereafter another dog on the control drum may reverse the pilot valve controlling the admission of pressure fluid through the port 270, so as to relieve the pressure, and the pilot valve controlling port 260 admits pressure to again project the detent 257. The retraction and projection of the detent 257 are both accomplished during the time the turret is feeding forwardly to depress the valve 272. The detent need be held in retracted position only long enough to permit the cam drum to rotate the dog 256 out of the way of the detent 257. Since the control drum makes only one revolution for six revolutions of the cam drum, it will be necessary to have twelve reversals of the pilot valves controlling the fluid pressure through the ports 260 and 270, and twelve separate dogs such as 267 may be employed for that purpose, or some of the dogs may be employed for actuating more than one pilot.

The control drum 222, as has been stated, controls the pilot valves which serve to admit and exhaust pressure fluid to various devices, such as piston valves, hydraulic pistons, etc., as have been heretofore described and as will be described. These pilot valves may be arranged in blocks 275, as shown more particularly in Figs. 17, 18 and 19. The control drum may be provided with the requisite number of peripheral slots 276 for receiving the dogs, such as 267 and 221, which may be moved about in the slots and located at the proper positions circumferentially of the control drum, as may be dictated by the particular requirements of any particular case. The control drum may also actuate certain valves or clutches mechanically. For example, the gear sets shown in Fig. 23 are actuated by the lever systems 220 and 225, as has already been described.

The control drum 222 once during each cycle of the machine serves to throw out the main or final driving clutch 192 (Fig. 20), and stops the rotation of the cam and control drums, after which the chuck rotation is stopped, and a new piece of work chucked and a new cycle of operations started thereon. This action will now be described.

Referring particularly to Figs. 2, 20, 21 and 22, the clutch sleeve 192 (Figs. 20 and 21), when in the neutral position shown in the drawings, does not drive the cam drum and control drum and the latter are stopped. This clutch sleeve 192 is actuated by a fork 277, which may be pivotally mounted at 278 on the frame of the machine. One end of the fork 277 may be pivotally connected at 279 to a link 280, the opposite end of which is pivotally connected to a bell crank lever 286, at 282. The lever 286 is pivoted to the frame at 283, so that, by rocking the same back and forth, the clutch sleeve 192 will be shifted. The automatic shifting of the clutch sleeve 192 is effected by a lever 281 pivoted to the frame at 283 and which carries a roller or cam follower 284, which is adapted to be engaged by dogs, such as 285, carried by the end of the control drum 222. The levers 281, 286 are connected by a lost motion connection 287. The lower end of lever 281 may be pointed at 288 and acted on by a spring pressed plunger 289 or other snap action means. Thus, by positioning one dog, such as 285, so as to shift the roller 284 toward the left as viewed in Fig. 21, the clutch sleeve 192 will be shifted toward the left and the slow traverse will be thrown in. By positioning a dog to shift the sleeve 192 in the opposite direction the fast traverse will be actively employed. The requisite number of dogs, such as 285, are positioned circumferentially about the end of the drum, so as to shift the clutch sleeve 192 to the right and to the left as often as desired during a cycle of the machine. During the shifting above described the bell crank lever 286 is free of the arm (290 to be later described) and may rock freely with the lever 281. The lost motion connection 287 is important in that the lever 281 is rocked by the dogs 285 past the dead center of the snap action means 289 before the clutch throwing lever 286 moves the clutch sleeve 192 at all. The snap action means 289 then almost instantly shifts the clutch sleeve 192 from the fast to the slow traverse or vice versa.

Figure 21:
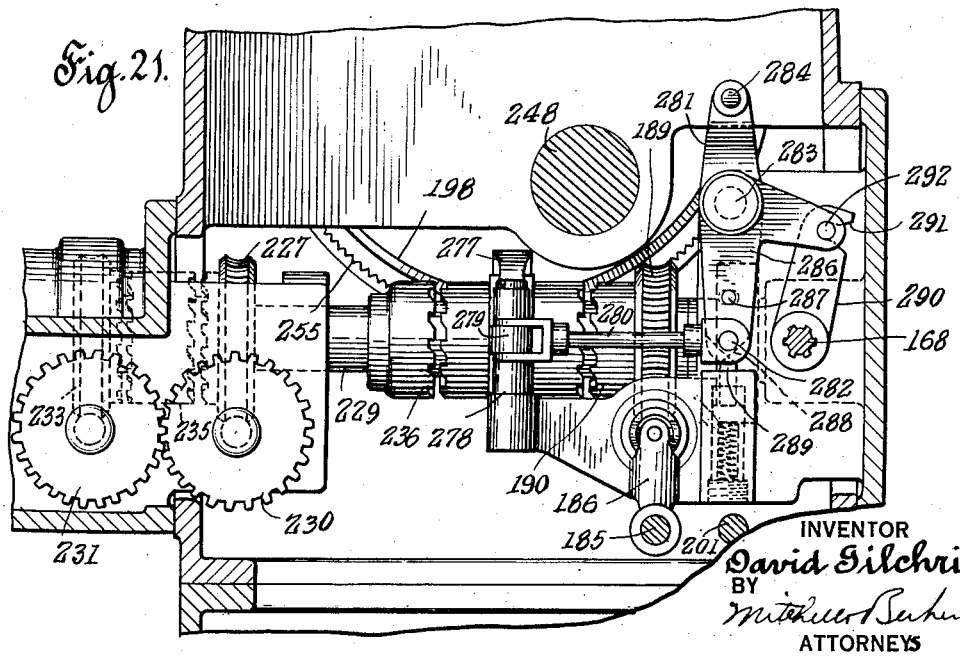
Fig. 21 is a vertical view of parts shown in Fig. 20.
Figure 26:
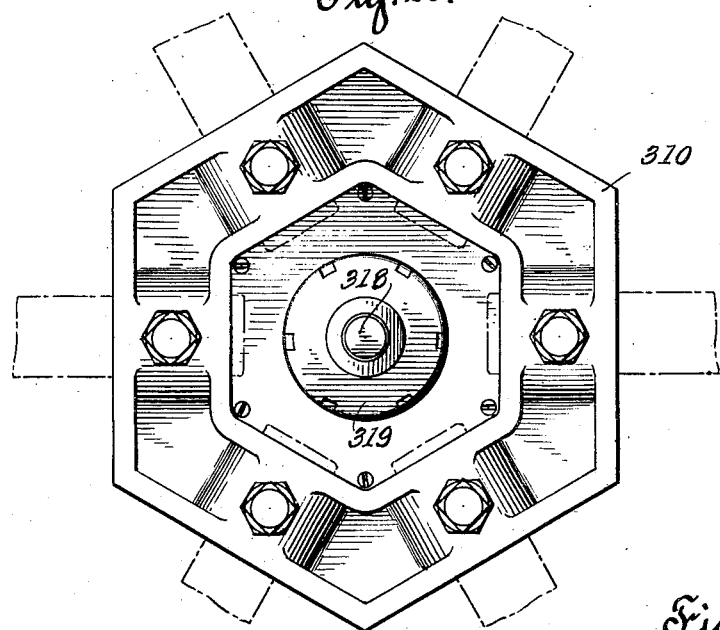
Fig. 26 is a top plan view of the turret.

Now, in order to shift the clutch sleeve 192 into the neutral position shown in Figs. 20 and 21 both automatically and manually, I may employ the following mechanism:

A lever 290 is splined or otherwise fixedly carried upon the control shaft 168 extending longitudinally of the control drum. The end of the lever 290 is provided with a wide-mouthed tapering slot 291, which is adapted to engage the pin 292 on the bell crank lever 286, regardless of the position of the bell crank lever. Thus, assuming the clutch sleeve 192 to be in either extreme clutched position, by rotating the lever 290 toward the right as viewed in Fig. 21, the pin 292 will be engaged and the bell crank lever moved into the neutral position shown in Figs. 20, 21 in which case the clutch sleeve 192 will be held in the neutral position.

The control shaft 168 may be moved manually by means of a handle 293 (Figs. 2 and 16), so as to at any time throw out the feeds and this shaft 168 is partially rotated once during each cycle of the machine by means of the control drum, so as to stop the feed. In the form shown the control drum is provided with a dog 294 (Figs. 5 and 16), to engage beneath a lever 299, for the purpose of rotating the shaft 168 by means now to be described. A lever 295 is keyed to the control shaft 168. To this lever a block 297 is pivoted at 296 and the block 297 carries a spring pressed pawl 298. The pawl 298 serves as a trigger and engages the lower end of the lever 299, which may be freely journaled on the shaft 168. The block 297 is connected to a lever 301 by a lost motion connection 302. The opposite end of the lever 299 may carry a pin or roller 300, positioned in the path of the control dog 294 on the control drum, so that when the dog 294 engages the roller 300, the lever 299 will be swung about the shaft 168 and, if the pawl 298 be engaged as shown in Fig. 16, the lever 295, and consequently the shaft 168 to which it is keyed, will be rotated. This rotation of the shaft 168 rotates the lever 290 (Fig. 21) previously described, and the forked end 291 of the latter serves to embrace the pin 292 and throw the main clutch sleeve 192 into the neutral position illustrated in Figs. 20 and 21. Thus, it will be seen that the control drum 222 at the end of each cycle throws out all feeds for the cam and control drum and, by the means heretofore described in connection with Fig. 15, the cross slide feeds are also thrown out, provided they have not already been thrown out by the automatic means controlled by the cross slide control spool or drum 136.

The chuck rotation could then be stopped by moving the control handle 27 heretofore described, and a new piece of work chucked. After this the chuck rotation would be started but there would be no feed of either the cross slides or the cam and control drum. The initiation of the feeds for each cycle may be accomplished manually by means of the handle 293. It will be remembered that, at the end of the cycle, the roller 300 (Fig. 16) will ride at the top of the dog 294, and the trigger or spring pressed pawl 298 will be engaged with the lever 299, substantially as shown. I provide means for breaking this connection and manually rotating the shaft 168 in the proper direction for throwing in the feeds. In the form illustrated I employ the lever 301, which may be freely movable on the shaft 168. The lower end of the lever 301 is secured to the end of the block 297 by a pin and slot connection or other lost motion connection 302 as described. The hub 303 (Fig. 5) of the lever 301 is connected to the hub 304 of the lever 295 through a lost motion connection, as indicated in dotted lines at 305 (Fig. 16). The lever 301 is connected to the handle 293 by a link 306. The positions of the parts shown in Fig. 16 are the "in" or "operating" positions. As soon as the dog 294 engages beneath the roller 300 feed will be stopped and the lever 299, as well as others actuated by it and including the handle 293, will be thrown to the "out" position. Now, to initiate the feed, the handle 293 is moved inwardly, and during the first part of that movement the inner end of the lever 301, through the loose connection 302, swings the block 297 clockwise as viewed in Fig. 16, and throws the pawl 298 out of engagement with the lever 299. Further inward movement of the handle 293 serves to cause the lost motion at 305 to be taken up and, since by that time the pawl 298 has been disengaged, further movement will swing the lever 295 and with it the shaft 168, so as to throw in clutches to initiate the feeds—both the cross feeds and the main turret feed. As soon as the control drum 222 rotates so as to remove the dog 294 from the path of the roller 300, the lever 299 swings down into substantially the position shown in Fig. 16, and the pawl 298 again snaps into place, as shown in Fig. 16, thus again setting the control for automatic actuation at the end of the cycle.

It should be noted that the handle 293, when released, springs out slightly under the influence of springs 307 or equivalent devices, so as to permit the block 297 to swing back to its setting position, as indicated in Fig. 16, and also to free the lost motion connection shown at 305. When the machine is operating and it is desired at any time to manually throw out the feeds, all that is necessary is to draw the handle 293 outwardly and the shaft 168 will be rotated in a clockwise direction, so as to stop all feeds, as heretofore described.

*Turret and fluid pressure system*

Referring now particularly to Figs. 1, 2, 6, 7, 23 and 26 to 36, it will appear that I have disclosed a six-station turret 310, which is arranged for step-by-step rotation upon the turret slide 311, slidable on the bed guideways 98—98. The slide 311, as will be clear from Fig. 1, is of considerable length, to give long bearings on the guideways. In addition, the turret is so arranged and actuated that the forces set up during operation tend to balance each other and to prevent "kicking up" of the front end of the turret. Thus greater accuracy of performance and longer life of the machine result.

As illustrated, the tools are carried in the upper part of the turret, by chucks in the bores 312—312, and the resistance of the work piece for the active tool is longitudinal of the ways 98—98. The turret and slide are urged and move forwardly by pressure fluid in cylinders 313—313. The forward movement of the turret and slide is resisted by the cam 241 and the roller 240. As will be clear particularly from Fig. 23, the tool resistance and the resistance offered by the cam 241 are in the same direction and upon opposite sides of the horizontal plane passing through the working cylinders 313—313. In other words the pressure fluid in the cylinders 313 acts oppositely to the tool resistance and resistance of the cam 241. Therefore, by placing the moving force for the slide between the cam 241 and the tools of the turret, I obviate in a large measure the tendency of the turret slide to kick up at the front end. The forces set up constitute a couple. The wear on the parts is thus reduced and the accuracy of the machine is increased.

I have devised a new form of turret lock and indexing mechanism. In the form shown, the slide 311 is provided with a substantial bearing surface 314 and an inclined or tapered bearing surface 315. The turret head 310 is provided with corresponding bearing faces 316—317 fitting the slide. Non-rotatably secured to the slide is a substantial column or bolt 318. The bolt is threaded at 319 so as to fit the correspondingly threaded sleeve 320 rotatably held in the turret proper. The sleeve 320 is provided with adjustable means such as nuts 321, adapted to rest upon a central table 322 on the turret head. The sleeve 320 is movable by a rotating part, such as the hydraulic cylinder 323, which is oscillated by pressure fluid, as will be later described. It will be seen now that, by rotating the cylinder 323 and with it the sleeve 320 in one direction, the sleeve 320 will be drawn downwardly by the screw thread 319, and the adjustable nuts 321 bearing upon the central table 322 of the turret head 310 will draw the turret head downwardly and cause the bearing faces 314—316 and 315—317 to be forced into tight frictional engagement with each other, and the turret thereby securely locked. Conversely, by rotating the cylinder 323 and sleeve 320 in the opposite direction, the thread 319 will force the sleeve 320 upwardly and release the turret head, so that the same may be indexed. The bearing nuts 321 are adjustably arranged so as to be capable of adjustment to compensate for wear.

Figure 27:
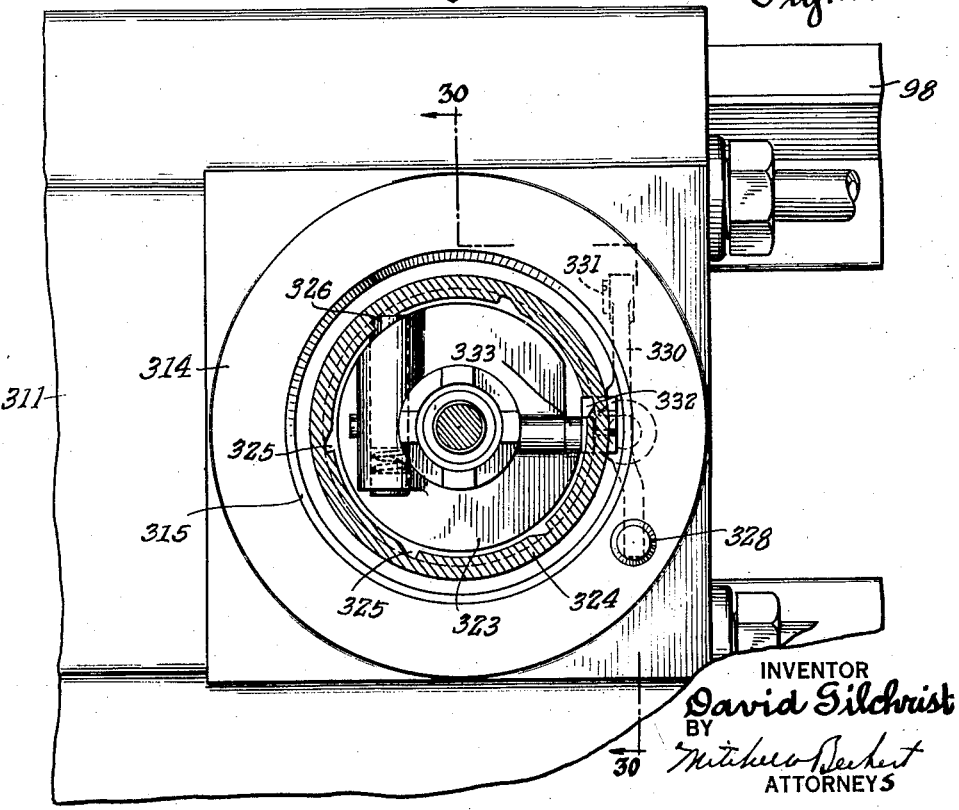
Fig. 27 is a horizontal sectional view through the lower end of the turret illustrating part of a turret indexing device.
Figure 28:
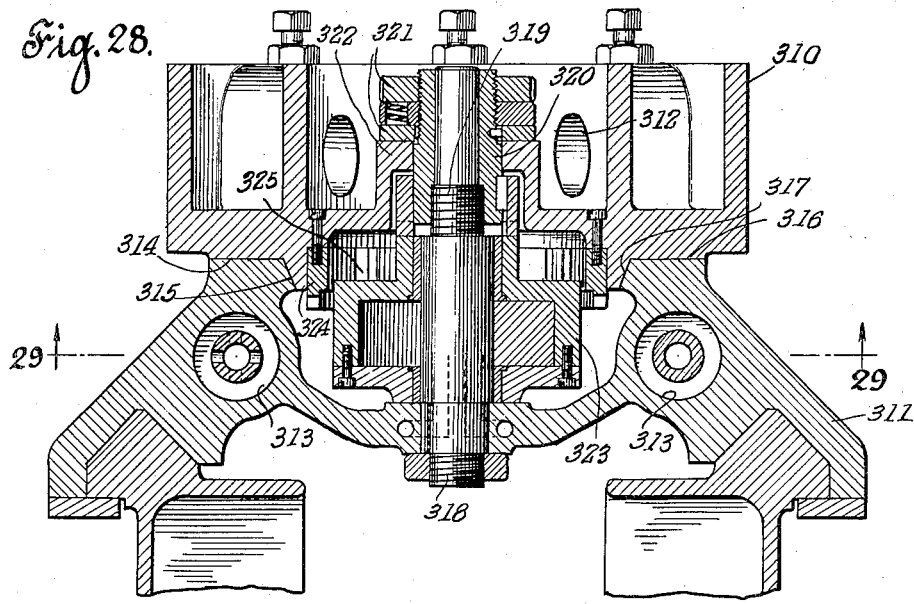
Fig. 28 is a vertical, sectional view through the turret and slide taken substantially in the plane of the line 28—28 of Fig. 29, and further illustrating the turret lock and indexing device.
Figure 29:
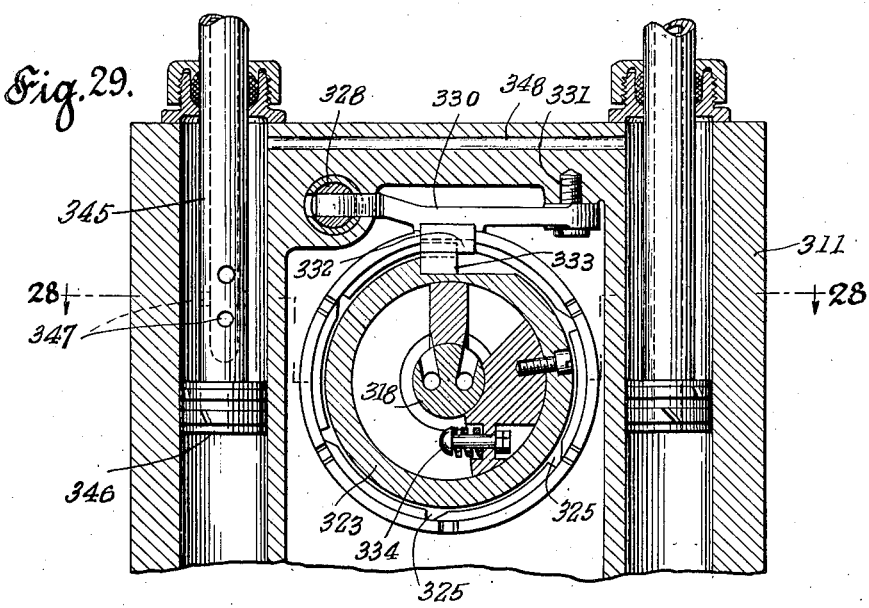
Fig. 29 is a sectional view taken substantially in the plane of the line 29—29 of Fig. 28.
Figure 32:
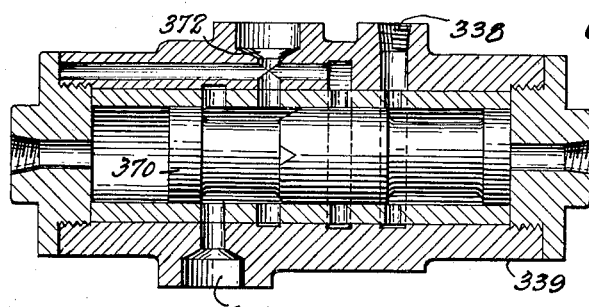
Fig. 32 is a sectional view through what I term a pressure change valve.
Figure 33:
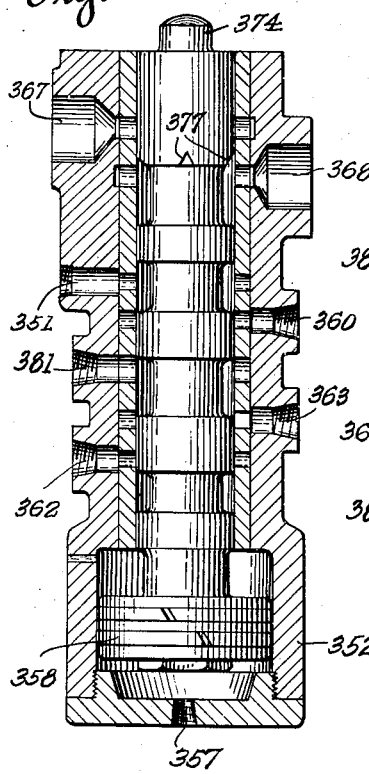
Fig. 33 is an enlarged sectional view through what may be termed the reverse and index valve (shown in Fig. 31)

The cylinder 323, during its rotation, serves not only to lock and unlock the turret, but also to index the turret head on the slide. As will be seen particularly in Figs. 27, 28 and 29, the turret head 310 is provided with a depending ring or skirt 324, having what may be termed ratchet notches 325, arranged annularly therein. These ratchet notches preferably correspond in number with the number of index positions of the turret head. The cylinder 323 is provided at the upper side with a spring pressed pawl 326, which is adapted to engage the ratchet notches 325, as shown particularly in Fig. 27. When the cylinder 323 is rotated clockwise as viewed from the top, the spring pressed pawl 326 wedges out of the notch 325 with which it was engaged, for example, as shown in Fig. 27. This rotative movement of the cylinder serves to lock the turret, and when the locking action is complete, the spring pressed pawl 326 may be almost over to another ratchet notch 325 rearward of the first notch. Now, when the cylinder is rotated in the opposite direction, the pawl 326 is carried with the cylinder, and the sleeve 320, also moving with the cylinder, serves to unlock the turret, after which the pawl 326 engages in one of the notches 325, and further rotation of the cylinder causes the pawl 326 to carry the skirt 324, and consequently the entire turret head 310 (which is now unlocked) around with the rotating cylinder. Thus, rotation of the cylinder in one direction serves to unlock the turret and subsequently index the same, while the return movement of rotation of the cylinder serves to again lock the turret.

The extent of rotation of the turret may be determined by an index pin or by other suitable means. In the form shown particularly in Figs. 27, 29 and 30, the turret has a plurality of tapered bores 327 for the reception of a correspondingly tapered index pin 328. The number of bores 327 preferably corresponds to the number of index positions of the turret. If it is desired during the operation of the device to skip any particular index position, the corresponding tapered bore 327 may be plugged, so that the index pin 328 cannot slide into place. The index pin 328 is slidably mounted in the slide 311, and a spring 329 serves to resiliently urge the pin upwardly, so that when a bore 327 comes into alignment with the pin, the latter will automatically slide upwardly into place. The index pin 328 is automatically withdrawn during the rotation of the cylinder 323, that is to say, during the first rotation of the cylinder the turret is unlocked, the index pin is next withdrawn and thereafter the turret indexed, as previously described. The means for withdrawing the index pin may take various forms. As illustrated, I employ a lever 330, pivotally mounted at 331 on the slide 311. The forward end of the lever engages a notch or bearing in the index pin 328 and moves with the index pin. The lever 330 carries a cam lug 332, which is adapted to be engaged by a pivotally mounted cam latch 333, carried by the cylinder 323. The latch 333 is so arranged that when moving toward the right, as viewed in Fig. 30, it will be rigidly supported and the cam surfaces will depress the lever 330, and consequently withdraw the index pin 328. When the index pin is withdrawn, the turret having previously been unlocked by the rotation of the cylinder, is indexed by the rotating cylinder. Now, when the next tapered bore 327 comes into alignment with the edge of the index pin 328, the latter is moved upwardly into the bore and the turret is then in the next indexed position. The lever 330 may have a lug 330' to coact with notches in the skirt 324, there being one notch for each index pin bore 327. Now if it is desired to skip one or more index positions of the turret the notch or notches may be plugged as desired so as to prevent the lug 330' from slipping into place and the index pin 328 will be held retracted even though the corresponding bore 327 be not plugged. The reversal of rotation of the cylinder 323 then again serves to lock the turret in indexed position, and the cam latch 333, in returning, may simply slide over the cam lug 332, so as to again position the same in operative position, as shown, for example, in Fig. 30. In order to cushion the indexing movement of the turret I may provide a resiliently pressed abutment 334 which may engage the fixed abutment of the hydraulic motor just before the indexing movement is completed. Thus, the jar of stopping the turret in indexed position is lessened.

It has been noted that the cylinder 323 is hydraulically actuated. In the preferred form I employ a greater fluid force for unlocking the turret and indexing the same, than is employed for locking the turret. Thus, it will be practically impossible for the turret to become locked so tightly that any parts would jam, and the turret may always be unlocked by the greater fluid force acting in the unlocking and indexing directions. In the preferred form I employ two separate sources of fluid under pressure, that is to say, I employ a high pressure pump and a low pressure pump, and preferably employ oil as the pressure fluid, for the reason that the oil may be utilized for lubricating various parts, as well as for other reasons.

Referring particularly to the partly diagrammatic representation of the hydraulic system in Fig. 36, 335 indicates a high pressure pump, while the low pressure pump is designated 336. It may be stated that, generally speaking, the high pressure fluid is employed only for unlocking the turret, indexing the same, driving the turret slide on its forward or working stroke, and for driving the cross slides. The low pressure fluid is employed for locking the turret, returning the turret to its retracted position, and for use in operating hydraulic change speed devices and for operating pilot valves, as well as valves and devices actuated thereby. It would, of course, be possible to employ only pressure fluid at a single pressure, but I prefer to employ the two different pressures, so as to make sure of at all times releasing the turret and so as to permit of smaller cylinders employing higher pressure.

Figure 34:
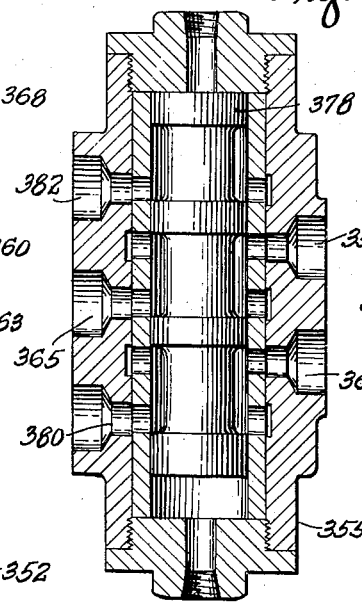
Fig. 34 is a sectional view through what may be termed a reverse valve.

The high pressure pump 335 is connected though the pipe 337 with the port 338 (Fig. 32) in the casing of what may be termed a pressure change valve, designated generally 339. The high pressure pump is also connected through the line 337 and branches 340, with valves 341, for admitting fluid to and exhausting fluid from the actuating hydraulics of the front and rear cross slides, respectively. The high pressure pump is also connected through the pressure change valve 339 with a pipe 342, which connects with what I term a safety valve 343 (shown in detail in Fig. 30), and from the safety valve 343 through a pipe 344 with a tubular piston rod 345 carrying the piston 346. This piston rod is fixed and the piston slides in one of the cylinders 313 of the turret slide heretofore described. The piston rod 345 is provided with a port 347 for releasing the pressure fluid within the cylinder, and a connection, such as the port 348, is made with the opposite cylinder 313, as will be clear from Fig. 36. By means of a branch pipe 350 the high pressure pump is also connected with a port 351 (Fig. 33) of what I term a reverse and index valve 352, which is secured on the rear side of the machine, so that parts to be described may be actuated by an adjustable slide carried with the turret during is reciprocations. High pressure fluid, after passing through the pressure change valve 339 on its exhaust passage passes through the pipe 353 and thence to a port 354 in the reverse valve 355 (Fig. 34). Another high pressure branch pipe 356 is connected above the safety valve 343 with a port 357 (Fig. 33) which communicates with the space beneath the actuating piston 358 in the reverse and index valve 352. From this valve 352 the high pressure connection 360 leads to the high pressure side of the motor cylinder 323.

The low pressure fluid line 361 connects to various pilot valves, the turret slide cylinders and to various actuating valves, etc. as shown in Fig. 36. The low pressure line 361 leads through the connection 362 to the reverse and index valve 352. A low pressure connection 363 connects the low pressure side of the motor cylinder 323 with the valve 352. In this connection is a choke valve 364, the operation and function of which will be later described. The low pressure line 361 connects at 365 to the reverse valve 355. From the reverse valve a low pressure line 366 connects to the top of the reverse and index valve 352 at the point 367. From the reverse and index valve a connection is made at 368 to a line 369, which conducts fluid for returning the turret slide. It will be noted that both the high and low pressure lines leading to the indexing hydraulic motor 323 lead directly from the high and low pressure lines and pass through the reverse and index valve. The remaining fluid connections usually lead to other valves, which are controlled from the control drum or otherwise.

The remaining construction and functions of the various parts of the hydraulic system may be more readily described in connection with the operation which is as follows:

Let us assume that the turret has been indexed by the rotating cylinder 323, but the turret has not yet been locked but is ready for the forward or ahead stroke. The index pin 328 will be projected so as to hold the turret in proper indexed position. High pressure fluid from the pump 335 will be conducted through the connection 327 to the port 338 in the pressure change valve 339. The piston valve 370 will have been moved to the extreme left hand position by means of the appropriate pilot valve connections 371, which are controlled by the dogs on the control drum, as heretofore described. With the piston valve 370 in the extreme left-hand position, as viewed in Fig. 32, high pressure fluid from the pump will thus be conducted through the port 338 and thence to the port 372, to which is connected the pipe 342. High pressure fluid then passes through the safety valve 343, and if the safety slide 373 be in the position indicated in Fig. 30, that is, the position permitted when the index pin 328 is in projected position, high pressure fluid will pass through the pipe 344 and thence through the hollow piston rod 345 and into the cylinders 313, so as to urge the turret slide toward the left, as viewed in Fig. 36, that is, in the forward or working direction. At the same time that fluid is admitted through the pipe 344, high pressure fluid passes through the pipe 356 to the connection 357, beneath the piston 358 in the reverse and index valve 352. The valve parts connected to the piston 358 will thus be elevated, and the nose 374 at the top of the valve member engaging the spring pressed cam slide 375 will raise the same against the spring 376 (Fig. 31). With the piston 358 raised, low pressure fluid from the cylinders 313 may pass out through the pipe 369, through the passage 368 in the valve 352, and thence to the connection 367. This valve connection may be arranged with choke ports 377, as shown more particularly in Fig. 33. The fluid passing from the connection 367 enters the pipe 366, which conducts it to the appropriate port in the reverse valve 355 (Fig. 34). With the piston valve 378 in the elevated position, under the influence of the appropriate pilot valve system 379, controlled by adjustable dogs on the control drum, as heretofore described, low pressure fluid may pass from the pipe 366 and thence to the exhaust port 380. Thus, with the high pressure fluid forcing the turret slide 311 in the forward direction, the low pressure fluid is exhausted in the manner just described.

When the turret slide is in position to be moved forwardly, the turret is being locked, that is to say, the locking motor 323 operates during a part of the forward movement of the turret. During this forward movement the piston valve 358 remains raised, as has been described. Low pressure fluid would thus be conducted through the pipe 362 and thence past the piston valve 352 and into the pipe 363, which ultimately leads to the low pressure side of the cylinder 323. The low pressure fluid then rotates the cylinder, to lock the turret in the manner heretofore described. During this rotation of the cylinder by the low pressure fluid, high pressure fluid passes out of the cylinder 323 through the pipe 360, and thence past the valve 352 and escapes through the exhaust port 381.

When the turret slide has reached the desired forward position, as determined by the feed cam, the control drum reverses certain valve connections so as to cause the return of the turret slide.

The reverse valve 378 is lowered, as viewed in Fig. 34, through the action of the pilot valve system 379. The pressure change valve (Fig. 32) is moved to the right, that is, into the position shown in Fig. 32, through the agency of the pilot valve system 371. High pressure fluid then is permitted to pass out of the cylinders 313 through the pipe 344, then through the safety valve 343 (which remains in the position shown in Fig. 30 during both forward and reverse movements of the turret slide), thence through the pipe 342, past the pressure change valve 370, and into the pipe 353. From the pipe 353 the high pressure fluid enters the port 354, and since the piston valve 378 has been depressed, the high pressure fluid will exhaust past the valve 378 and through the exhaust port 382. During this time low pressure fluid from the pipe 361 enters the reverse valve 355 through the pipe 365, and then finds its way past the lowered valve 378, and through the connection 366 it connects with the upper port 367 of the reverse and index valve. This reverse and index valve is maintained in its elevated position frictionally or otherwise. The low pressure fluid then passes through the passage 367, past the choke valve and into the port 368, connecting with the pipe 369, which enters the cylinders 313. The low pressure fluid then moves the turret slide backwardly, the high pressure fluid being exhausted during this movement, as heretofore described.

During this return movement, the reverse and index valve 352 remaining elevated, the low pressure fluid may be maintained on the turret locking cylinder. When the turret slide has been returned to a desired position, which is determined by the position of the adjustable slide 375 carried upon the turret slide, the cam slide 375, held down in the position indicated in Fig. 30 by the spring 376, engages the nose 374 on the valve member 358, and since the high pressure fluid beneath the piston 358 is open to the exhaust, the entire piston valve of the reverse and index valve 352 is lowered slightly beyond the position indicated in Fig. 33. This lowering of the reverse and index valve immediately cuts off the supply of low pressure fluid entering through the pipe 366 and port 367. The turret slide is then immediately brought to a stop. High pressure fluid then passes through the pipe 350, port 351, past the valve and into the pipe 360. The cylinder 323 of the indexing motor is then rotated, the first rotation serving to unlock the turret, as heretofore described, and withdraw the index pin 328, also as previously described, and further movement rotates or indexes the turret. When the index pin 328 is removed from its respective turret bore 327, the choke valve 364 comes into action. The choke valve 364 (Fig. 30), as illustrated, includes a piston valve having V-shaped choke ports 383, which, however, never completely close the passage through the pipe 363. When the index pin 328 is out of its bore 327, the choke valve 364 is lowered by the arms 330, so as to open a free passage through the low pressure pipe 363. The high pressure fluid then very quickly unlocks and indexes the turret, and when the pin 328 finds its next bore 327, that is, at the next indexed position, the choke valve 364 chokes the exhaust of low pressure fluid from the cylinder 323 and slows down the indexing movement of the turret, so that the pin enters properly, and the turret indexing movement is cushioned or gradually slowed down. The turret is then in indexed position, but not locked, until the next forward movement of the turret, as heretofore described.

Now, in order to prevent the turret from moving forward until the index pin is properly seated, I employ the safety valve 343 (Fig. 30). The valve member proper 373 is connected to a link 384, which is in turn connected to a bell crank 385, having a head positioned beneath the pin 386, movable with the index pin 328. A spring 387 urges the valve 373 into the open position shown in Fig. 29. Now, when the index pin 328 is out, the valve 373 is moved toward the left, so as to seal the passage through the safety valve, and high pressure fluid, which must all enter through the pipe 342, is completely cut off. Thus, if for any reason the turret is not properly indexed and the index pin in place in its bore, there can be no ahead movement of the turret.

Now, when the turret has been indexed and the index pin is in place, the pressure change valve 339 and the reverse valve 355 will have been appropriately moved (at any time while index pin 328 is withdrawn) by the respective pilot valve systems 379, 371, controlled by the control drum, and high pressure fluid from the pump will again be admitted to move the turret forwardly. When this high pressure fluid is admitted to move the turret forwardly, it is at the same time admitted through the pipe 356, so as to elevate the reverse and index valve, and the spring 376, holding the cam slide 375 down, will be compressed and the reverse and index valve will be maintained in its upper position by the fluid pressure, and on the return stroke by friction or other means. Thus, one complete cycle of the turret parts is completed.

Figure 35:
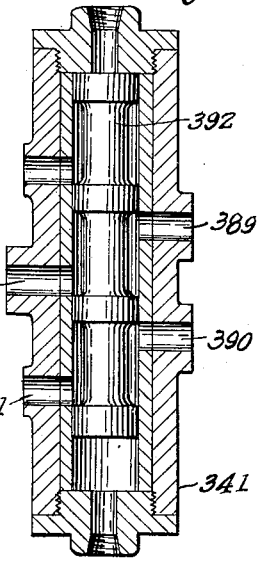
Fig. 35 is a sectional view through a cross-slide control valve.

As shown, both cross slides are actuated by high pressure fluid, the passage of which is controlled for each cross slide by a valve 341, both of which valves may be identical (Fig. 35). High pressure fluid from the pipe 340 enters the middle bore 388 and, with the valve in the position illustrated in Fig. 35, high pressure fluid enters the pipe 389 to move the cylinder in one direction. At the same time fluid from the other pipe 390 exhausts past the valve and through the exhaust port 391. When the piston valve 392 is shifted, under the influence of its appropriate pilot valve system 393, controlled by the cam slide control spool, the pressure connections are reversed and the cross slides moved in the opposite direction in a manner which will be readily understood. The three-speed change devices heretofore described and one of the feeds in the preferred form illustrated are controlled by hydraulic pilot valve systems 394, as shown in Fig. 36. A pilot valve system 395 controls the detent 257 in the manner heretofore described.

The oil of the pressure fluid system, when oil is employed, is preferably used for lubrication of various moving parts, and I therefore lead all or some of the oil discharge pipes to points where the flow of oil will lubricate various slides, gears, etc. The oil pressure lines are provided with relief valves, and all oil discharged from such valves may be flowed over moving parts. The discharged oil returns to a sump in which the high and low pressure pumps are preferably located. The pumps preferably are driven continuously by the main drive or from any other source of power.

*Set up and operation*

A hand crank or other manually actuated device is provided for manually operating the machine for setting up for any particular job. Such hand operated devices are well known and need not be shown or described.

The dogs for moving the hydraulic actuators 61 controlling the chuck speed are set circumferentially of the control drum 222, so that the desired speeds will be obtained during the requisite periods as determined by the angular position of the control drum. Thus, the first operation to be performed on the work piece in the chuck may require a slow speed, in which case the speed gearing for the chuck will be set automatically to produce that slow speed. The next operation may require a very high speed, in which case the chuck speed gearing would be automatically changed by shifting one or more of the hydraulic actuators 61 for the purpose of attaining that speed. Other speeds for subsequent operations on the work piece may be similarly obtained by arranging the proper control dogs on the control drum 222 so as to give just the proper speeds for each operation. Change gears (Figs. 9, 10 and 11) may be employed for initially varying the range of speeds obtainable by shifting the hydraulic actuators 61.

As has been stated, the cross-slide, or cross-slides, as well as the slow traverse normally used for feeding the turret and work relatively to each other, are actuated by the chuck rotating means and operate only while the chuck is rotating. The cross-slides may be caused to feed inwardly simultaneously, or they may operate one after the other. The positioning, characteristics and speed of the cams 114—132 (Fig. 5) determine the rate of feed of the cross-slides. The dogs 137 on the cross-slide spool 136 are positioned circumferentially of that spool, so that the hydraulic valves 393 (Fig. 36) actuate the cross-slides at the desired times. The speed of the cross-slides is dependent upon the speed of the chuck as well as upon the particular change gear arrangement shown in Figs. 13, 14 and 15. The cross-slides may act during a complete cycle of the machine, although one or both cross-slides may finish their operations in advance of the completion of a cycle, and be retracted by the hydraulic control means 393 actuated by the proper dogs 137 on the cross-slide control spool 136. The dog 165 on the cross-slide spool 136 is positioned so as to throw out the cross-slide feeds at any desired time, but usually, at or near the end of a cycle (Figs. 5, 14, 15).

The feed of the turret may be varied for each stroke thereof, that is, for each different tool carried by the turret. These different rates of feed are determined not only by the characteristics of the cam 241, but by the speed of the cam drum 180. The speed of the cam drum 180 is dependent upon the fast and slow traverse, it being understood that normally the slow traverse is used for the feeds and the fast traverse for returning the cam drum 180 to its extreme or any desired initial position. As illustrated, two of the gear sets of the slow traverse are actuated mechanically by dogs on the control drum (Figs. 17 and 19). One gear set (Fig. 20) is actuated by hydraulic means under the control of a pilot valve similar to those described. Change gears may be employed for varying the range of feeds of the turret. Thus, by positioning the dogs, such as 267, at the proper points circumferentially of the control drum 222, the desired feeds of the turret may be obtained, and these feeds will, of course, be arranged so as to correspond with the speed of the work piece, as heretofore described, by setting the speed dogs on the control drum 222.

If the turret is not fed forward, retracted, and again fed forward to the work in exact synchronism with the cam drum 180, the latter is stopped by hydraulically actuated detent means (Fig. 24), so that the cam drum must wait for the turret to come up to position before the feed as controlled by the cam drum will continue.

The turret, when it reaches its retracted position, shifts a valve which cuts off the flow of pressure fluid used to retract the turret, and this valve serves to unlock and index the turret while in retracted position. If the index pin or other positioning means (Fig. 30) be not in place, the pressure fluid for advancing the turret is not permitted to enter the cylinder for advancing the turret, and, consequently, unless the turret is in proper indexed position, the turret cannot feed forwardly. At the beginning of the forward feed of the turret, the latter is locked by the hydraulic means heretofore described.

The extent of forward feed of the turret is determined by the characteristics and position of the cam drum 180. The cam and control drums are geared together, and, when the desired forward feed has been reached, the appropriate dog 237 on the control drum shifts valves (Fig. 36) to retract the turret. At the end of each cycle of the machine, the dog 294 (Fig. 16) shifts the clutch sleeve 192 (Fig. 20), so as to stop the rotation of the cam and control drums. The feed of the cam and control drums on the next cycle is initiated by moving the handle 293 (Fig. 16), so as to manually throw in the clutch, as heretofore described in detail. At the end of the cycle, the chuck control handle 27 (Fig. 5) is moved, so as to stop the rotation of the chuck, and consequently of the gearing controlling both the cross-slides and the slow traverse for the cam and control drums.

After the machine has been set up by positioning the dogs, valve shifting slides, etc., as above described, the machine will automatically go through its cycle of operations and will be automatically stopped at the end of the cycle. The chuck rotation is manually started and stopped by the handle 27, and, at the beginning of a cycle, after the chuck has begun to rotate, the handle 293 is thrown in to again initiate the feeds of the turret and cross-slides.

The machine, as heretofore described, will turn out work very rapidly, since each operation may be performed under the optimum speed and feed conditions. Since the feeds are determined by comparatively slow moving control drums, the extent of feed of both the cross-slides and the turret may be accurately determined. The entire machine is exceedingly accurate in its operation, and since all operations are performed under the optimum feed and speed conditions, much time is saved and wear on the tools and other parts is reduced. A further point tending toward accuracy is the absence of any substantial tendency of the turret to be elevated or kicked up in front at the time and during the time the tool and work are in engagement.

When oil is used as a pressure fluid, the machine may be conveniently and efficiently lubricated by the oil discharging from the various cylinders and relief valves, and no separate oiling devices need be employed.

The machine is exceedingly flexible in that numerous feeds and speeds may be obtained, and this without the extensive use of change gears. The range of speeds and feeds may, of course, be greatly varied by the employment of change gears.

While the invention has been described in detail as embodied in a turret lathe, it is to be understood that the principles of the invention are of broader application, and may be employed in connection with machines of other types. The particular arrangement of gearing, hydraulic means, and other features, may be widely varied by those skilled in the art. I do not wish to be limited to the particular embodiments of various parts shown, except as may be required by the claims and the prior art.

I claim:

1. In a machine tool, a frame, a turret slide slidable on said frame, fluid pressure means acting on said slide to advance the latter, and feed means acting on said turret slide to retard the latter against said fluid pressure means, said fluid pressure means being located between said feed means and the point of tool resistance whereby the tendency of the turret slide to tip is reduced to a minimum.

2. In a machine tool, a work holder, a tool holder, fluid pressure means below the plane of said work and tool holders for advancing said work and tool holders toward each other, a mechanical drag below said fluid pressure means and resisting the action thereof, whereby the working resistance between said work and tool holders and said mechanical drag act in the same direction and opposite to the direction of action of said fluid pressure means.

3. In a machine tool, a frame having guideways thereon, a holder slidable on said ways and extending thereabove, a mechanical drag for said sliding holder and located below said ways, and fluid pressure means for moving said holder, said fluid pressure means being located above said mechanical drag and below the upper part of said holder.

4. In a turret lathe, a frame, a rotatable work holder thereon, a turret slidable on said frame for advancing a tool relatively to said work holder, fluid pressure means located below the tool of said tool holder for advancing the same to the work holder, and a mechanical drag for resisting the action of said fluid pressure means and located below said fluid pressure means.

5. In a machine tool, a movable member, fluid pressure means for moving said member, cam means for controlling the rate of feed of said member, a control drum for controlling said fluid pressure means, means for driving said cam means, and means actuated upon rotation of said control drum for varying the speed of said cam means.

6. In a machine tool, a slidable member, fluid pressure means for advancing and retracting the latter, feed cam means for determining the rate of feed of said member, a control drum for controlling said fluid pressure means, driving means for said cam means, and means under the control of said control drum for varying the speed of said driving means.

7. In a machine tool, a chuck, gear means including a clutch for rotating said chuck, a tool to be advanced and retracted relatively to said chuck, fluid pressure means for advancing and retracting said tool relatively to said chuck, a control drum for controlling said fluid pressure means, and fluid pressure means controlled by said control drum for actuating said clutch for varying the speed of said chuck.

8. In a machine tool, a chuck, variable speed gear means including a shaft transverse to the axis of said chuck for actuating said chuck, pressure fluid means for varying the speed of said variable speed gear means including a cylinder substantially in line with said transverse shaft, a control drum, and means actuated by said control drum for controlling said pressure fluid means for varying the speed of said gear means.

9. In a machine tool, a drive means, a chuck, means for clutching and unclutching said drive means and chuck, means including gearing connected to said chuck and driven thereby and independent of said drive means when the latter is unclutched from said chuck, and a tool controlled by said means including gearing to determine the rate of feed of said tool relatively to said chuck and fluid pressure actuated means for feeding said tool.

10. In a machine tool, a chuck, a driving quill, means including a clutch means for connecting said driving quill and chuck for rotating the latter, a tool, and means for feeding said tool, said means being driven by said clutch means.

11. In a machine tool, a driving quill, means for driving the same, a sliding clutch sleeve to be clutched to said driving quill, a chuck rotatable with said clutch sleeve, a gear actuated by said clutch sleeve, a tool, and means connecting said gear with said tool for feeding the latter.

12. In a machine tool, a work holder, a tool holder, fluid pressure means for advancing said work and tool holders, means for controlling the extent of movement of said work and tool holders relatively to each other in one direction, and a detent for holding said means.

13. In a machine tool, a work holder, a tool holder, fluid pressure actuated means for feeding said work and tool holders relatively to each other, cam means for controlling the movement of said work and tool holders relatively to each other in one direction, means for driving said cam means, and detent means for arresting the movement of said cam means while permitting movement of said driving means.

14. In a machine tool, a work holder, a tool holder, a cam drum for controlling the movement of said work and tool holders relatively to each other in one direction, driving means for said cam drum, fluid pressure means for advancing said work and tool holders relatively to each other, a control drum connected to said cam drum, means for arresting the movement of said cam and control drums while said driving means remains in operation.

15. In a machine tool, a work holder, a tool holder, a cam drum, a fluid pressure control drum, means for driving said control drum and cam drum at a predetermined relative rate of speed, and means for arresting said drums during each cycle of the machine.

16. In a machine tool, a turret, fluid pressure means for actuating the same, feed means for determining the rate of feed of said turret, detent means for arresting the movement of said feed means, and means dependent upon the position of said turret for actuating said detent means.

17. In a machine tool, a turret, fluid pressure means for actuating the same, feed means for determining the rate of feed of said turret, a detent for arresting said feed means, fluid pressure means for actuating said detent, and means controlled by the position of said turret for actuating said detent.

18. In a machine tool, a turret, fluid pressure means for actuating the latter, a control drum for controlling said fluid pressure means, a feed cam drum for determining the rate of feed of said turret, means connecting said control and feed cam drums for normally rotating the same at a predetermined relative rate of speed, and friction means for driving one of said drums.

19. In a machine tool, a chuck, means for rotating the same, a slidable turret, fluid pressure actuated means for feeding said turret, driving means for determining the rate of feed of said turret, and automatic means for stopping said turret feed.

20. In a machine tool, a chuck, means for rotating the same, a slidable turret, fluid pressure actuated means for feeding said turret, means for determining the rate of feed of said turret, and manual means for stopping the feed of said turret at will.

21. In a machine tool, a work holder, a cross slide, a longitudinally reciprocating tool, fluid pressure means for actuating said reciprocating tool and said cross slide, independent means for controlling the movement of said reciprocating tool and cross slide, and means for synchronizing the movements of said reciprocating tool and cross slide during each cycle of the machine.

22. In a machine tool, a work holder, a longitudinally reciprocating tool holder, a cross slide, fluid pressure means for actuating said tool holder and said cross slide, control means for said actuating means, manual means for starting both said control means simultaneously, and automatic means for stopping said control means and synchronizing the same during each cycle of the machine.

23. In a machine tool, a chuck, means for rotating the same, a tool, fluid pressure means for advancing said tool and chuck, a control member for controlling the action of said fluid pressure means, a feed cam movable with said control member for controlling the advance of said tool, and means actuated upon rotation of said control member for arresting the movement of said feed cam and said control member.

24. In a machine tool, a chuck, means for rotating the same, a tool, fluid pressure means for advancing the same, a control means for controlling said fluid pressure means, a feed cam for regulating the advance of said tool, means for driving said control means, clutch means for actuating said control means and cam, and means actuated by said control means and cam for unclutching said clutch means and arresting the movement of said control means and cam upon a predetermined rotation thereof.

25. In a machine tool, a chuck, means for rotating the same, a tool, fluid pressure means for advancing and retracting said tool, a control means for controlling said fluid pressure means, a feed cam for controlling the rate of advance of said tool, driving means for said control means and cam, and means actuated upon rotating of said control means for arresting the drive thereof upon a predetermined rotation of said control means.

26. In a machine tool, a reciprocable member, fluid pressure actuated means for moving said member, cam means for controlling the advance of said member, means including a clutch for driving said cam means, and trigger mechanism for opening said clutch, said trigger mechanism being actuated upon a predetermined movement of said cam means.

27. In a machine tool, a tool, fluid pressure actuated means for advancing said tool, cam means for controlling the advance of said tool, means including a clutch for driving said cam means, trigger mechanism for opening said clutch, said trigger mechanism being actuated upon a predetermined movement of said cam means, and means for actuating said trigger mechanism to close said clutch to again actuate said cam means.

28. In a machine tool, a chuck, a tool, fluid pressure means for actuating the latter, feed cam means for controlling the rate of feed of said tool, gear means including a clutch for driving said feed cam means, and means actuated upon a predetermined movement of said feed cam means for opening said clutch to arrest the movement of said feed cam means.

29. In a machine tool, a chuck, a tool, fluid pressure means for actuating the latter, feed cam means for controlling the rate of feed of said tool, gear means including a clutch for driving said feed cam means, means actuated upon a predetermined movement of said feed cam means for opening said clutch to arrest the movement of said feed cam means, and manual means for closing said clutch to again start said feed cam means.

30. In a machine tool, a chuck, a tool, fluid pressure means for advancing and retracting said tool and chuck, movable control means for said fluid pressure means comprising a mechanical stop for determining the extent of feed of said tool, and means for arresting the movement of said control means.

31. In a machine tool, a chuck, a tool, fluid pressure means for actuating said tool, a control means for controlling said fluid pressure means, feed cam means for determining the rate of feed of said tool, means including a clutch for driving said control means and feed cam means, and means actuated upon movement of said control means and cam for opening said clutch and arresting the movement of said control means and cam.

32. In a machine tool, a chuck, a tool, fluid pressure means for moving said tool and chuck, a control means for controlling said fluid pressure means, feed cam means for determining the rate of feed of said tool and chuck, means including a clutch for driving said control means and feed cam means, means actuated upon movement of said control means and cam for opening said clutch and arresting the movement of said control means and cam, and manual means for closing said clutch to again start the movement of said control means and feed cam means.

33. In a machine tool, a turret, fluid pressure means for actuating the latter, a control drum for controlling said fluid pressure means, feed cam means for determining the rate of feed of said turret, means for driving said feed cam means, and means actuated during a cycle of the machine for arresting the movement of said control drum and stopping the action of the machine.

34. In a machine tool, a turret, fluid pressure means for actuating the latter, a control drum for controlling said fluid pressure means, feed cam means for determining the rate of feed of said turret, means for driving said feed cam means, means actuated during a cycle of the machine for arresting the movement of said control drum and stopping the action of the machine, and manual means for again starting said control drum.

35. In a machine tool, a turret, fluid pressure means for actuating the same, a control drum for controlling said fluid pressure actuated means, feed cam means for determining the rate of feed of said turret, means including a clutch for driving said control drum, and means actuated once during each cycle of the machine for opening said clutch to stop said control drum.

36. In a machine tool, a turret, fluid pressure means for actuating the same, a control drum for controlling said fluid pressure actuated means, feed cam means for determining the rate of feed of said turret, means including a clutch for driving said control drum, means actuated once during each cycle of the machine for opening said clutch to stop said control drum, and manual means for closing said clutch to again start the operation of said control drum.

37. In a machine tool, a turret, fluid pressure means for indexing the latter, and means for choking the supply of pressure fluid for indexing said turret when the turret approaches its indexed position.

38. In a machine tool, a turret, fluid pressure means for advancing and retracting said turret, and fluid pressure means for unlocking, indexing and locking said turret, a source of high pressure fluid for advancing said turret and for unlocking the same, and a source of low pressure fluid for retracting said turret and for locking the same.

39. In a machine tool, a turret, hydraulic means for actuating said turret, and means for leading the liquid of said hydraulic means after exhaust to moving parts for lubricating the latter.

40. In a machine tool, a work holder, a tool holder, fluid pressure means for advancing the same relatively to each other, and means for leading fluid exhausted from said fluid pressure means to moving parts of said machine tool for lubricating the latter.

41. In a machine tool, a chuck, means for rotating the same, a tool, means for advancing the same relatively to said chuck, feed cam means for controlling the rate of feed of said tool, gear means for driving said feed cam means, and a base plate carrying part of said gear means, said base plate and gear means being bodily removable from said frame.

42. In a machine tool, a work holder, a tool holder, fluid pressure actuated means acting on one of said holders for moving said holder relatively to the other, drag means for resisting the action of said fluid pressure actuated means, the line of application of the force applied to said holder by said fluid pressure actuated means being located nearer the line of action of the tool resistance between said holders than the line of the application of the force applied by said drag means for the purpose described.

43. A machine frame providing a guide, a slide mounted on the guide, an actuator for the slide along the guide including a piston and cylinder device between the frame and slide, a fluid pressure supply, a slide control cycle-determining valve means for the supply to the device to actuate the slide along the guide, and a power driven variable speed escapement providing a control for the actuator.

44. A machine tool having in combination, a bed, a support movably mounted thereon, pressure fluid operated means for moving said support, a movable cam supported on said bed, means movable with said support arranged automatically to engage said cam and restrain the speed of movement imparted to said support by the pressure fluid operated means during a portion of the forward stroke thereof and means for moving said cam, said means being disengageable from said cam upon reverse movement of said support.

45. A machine tool having in combination, a movable member, hydraulic means for reciprocating the member at a traverse rate, a receding abutment for the member effective only when the latter is moving in a certain direction to limit the movement imparted to the member by said hydraulic means to a cutting speed, mechanical means for moving the abutment and means operable upon the reversal of said hydraulic means at the end of the movement of the table in said direction to render said abutment ineffective to limit the return speed of said member.

DAVID GILCHRIST.